US008956747B2

(12) United States Patent
Itoi et al.

(10) Patent No.: US 8,956,747 B2
(45) Date of Patent: Feb. 17, 2015

(54) BATTERY MODULE

(71) Applicant: Panasonic Corporation, Osaka (JP)

(72) Inventors: Toshiki Itoi, Nara (JP); Shunsuke Yasui, Osaka (JP); Hiroshi Takasaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/144,305

(22) Filed: Dec. 30, 2013

(65) Prior Publication Data

US 2014/0113167 A1    Apr. 24, 2014

Related U.S. Application Data

(63) Continuation of application No. 13/394,272, filed as application No. PCT/JP2010/004674 on Jul. 21, 2010, now abandoned.

(30) Foreign Application Priority Data

Sep. 18, 2009 (JP) .................. 2009-216463

(51) Int. Cl.
| | |
|---|---|
| H01M 2/12 | (2006.01) |
| H01M 10/613 | (2014.01) |
| H01M 2/10 | (2006.01) |
| H01M 2/20 | (2006.01) |
| H01M 10/643 | (2014.01) |
| H01M 10/6566 | (2014.01) |

(52) U.S. Cl.
CPC ............ *H01M 2/12* (2013.01); *H01M 10/5004* (2013.01); *H01M 2/105* (2013.01); *H01M 2/1247* (2013.01); *H01M 2/1252* (2013.01); *H01M 2/204* (2013.01); *H01M 10/503* (2013.01); *H01M 10/5073* (2013.01); *H01M 2/1077* (2013.01); *H01M 2/206* (2013.01); *H01M 2200/00* (2013.01)
USPC .................... 429/82; 429/57; 429/72; 429/83

(58) Field of Classification Search
None
See application file for complete search history.

(56) References Cited

U.S. PATENT DOCUMENTS

| | | | | |
|---|---|---|---|---|
| 2006/0110656 | A1* | 5/2006 | Moores et al. | 429/83 |
| 2006/0222930 | A1* | 10/2006 | Aradachi et al. | 429/96 |
| 2009/0220851 | A1 | 9/2009 | Nakazawa et al. | |
| 2010/0047673 | A1 | 2/2010 | Hirakawa et al. | |
| 2010/0266880 | A1 | 10/2010 | Hirakawa et al. | |

FOREIGN PATENT DOCUMENTS

| | | |
|---|---|---|
| EP | 2 077 592 A1 | 7/2009 |
| EP | 2 352 186 A1 | 8/2011 |
| JP | 10-255736 A | 9/1998 |
| JP | 2003-045394 A | 2/2003 |
| JP | 2004-178909 A | 6/2004 |
| JP | 2005-322434 A | 11/2005 |
| JP | 2007-027011 A | 2/2007 |
| JP | 2008-269989 A | 11/2008 |
| WO | 2008/044430 A1 | 4/2008 |
| WO | 2009/110167 A1 | 9/2009 |

OTHER PUBLICATIONS

Extended European Search Report issued in European Patent Application No. 10816828.7 mailed Oct. 18, 2012.
Search Report issued in Chinese Patent Application No. 201080036090.X.
Non-Final Office Action issued in U.S. Appl. No. 13/394,272 dated Nov. 23, 2012.
Final Office Action issued in U.S. Appl. No. 13/394,272 dated Jun. 4, 2013.
Notice of Allowance issued in U.S. Appl. No. 13/394,272 dated Sep. 30, 2013.
International Search Report issued in International Patent Application No. PCT/JP2010/004674 dated Sep. 7, 2010.

* cited by examiner

*Primary Examiner* — Ladan Mohaddes
(74) *Attorney, Agent, or Firm* — McDermott Will & Emery LLP

(57) ABSTRACT

The case 20 housing a plurality of cells 100 is divided, by a circuit board 30 provided at the same sides of the cells 100, into a housing space 50 housing the cells 100 and an exhaust duct 60 for releasing a gas from the vents 8a of the cells 100 to outside the case 20. The vents 8a of the cells 100 communicate with the exhaust duct 60 through openings 30a formed in the flat plate 30. The exhaust duct 60 is divided into a first space 61 and a second space 62 by a partition 40 provided between the flat plate 30 and an external plate 21 of the case 20. The first space 61 communicates with the second space 62 through through holes 40a formed in the partition 40.

13 Claims, 21 Drawing Sheets

FIG.5
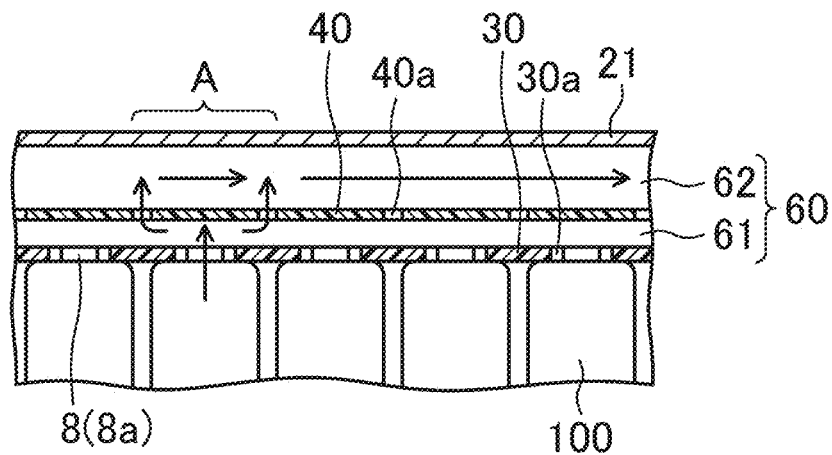
(a)
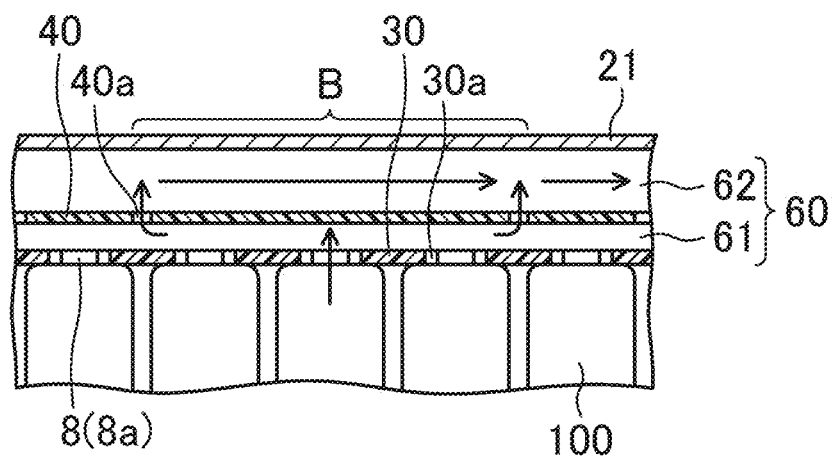
(b)
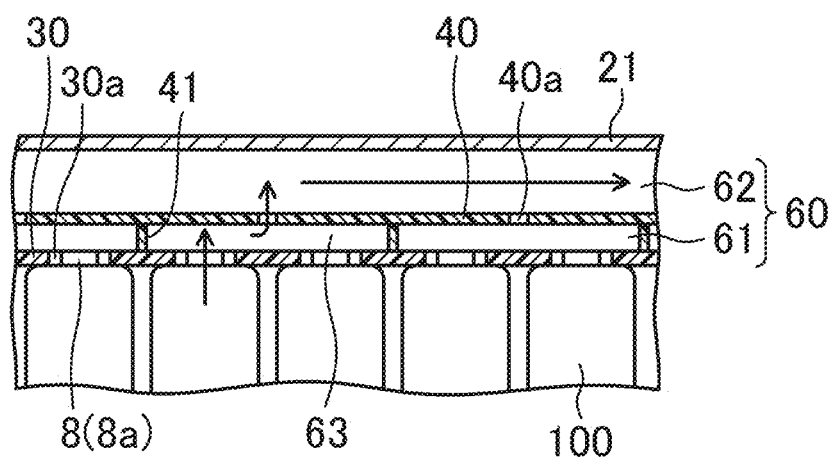
(c)

FIG.7
(a)
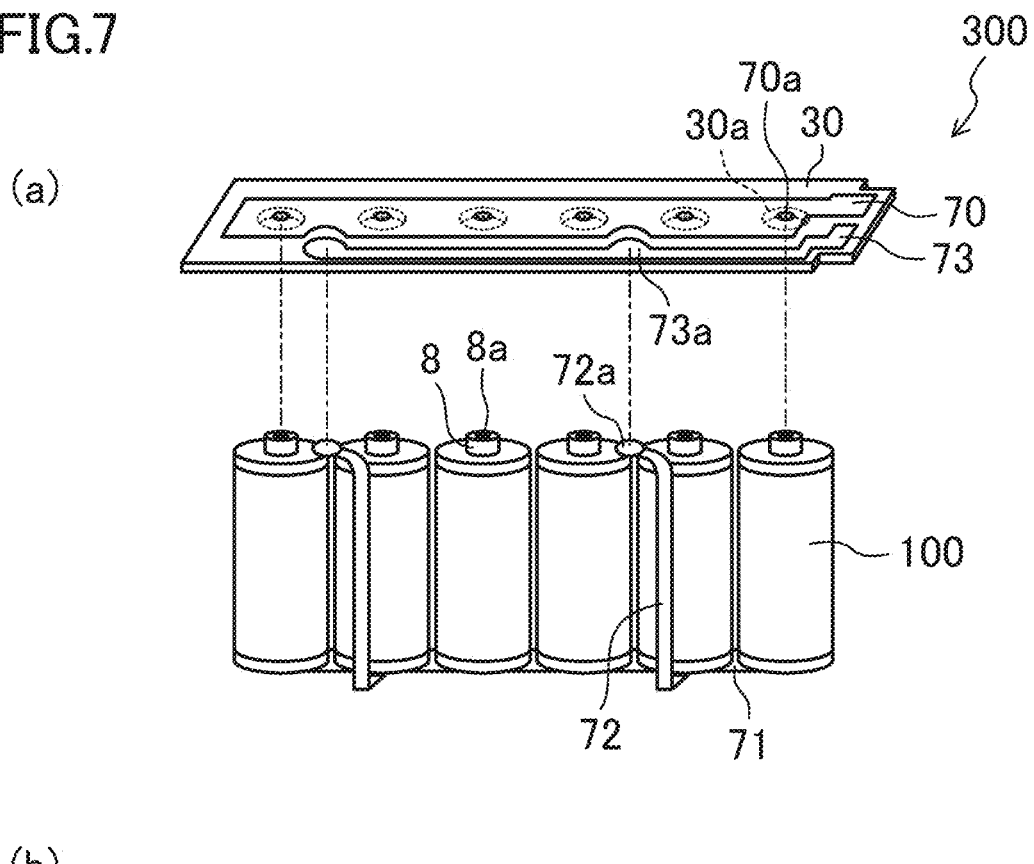
(b)
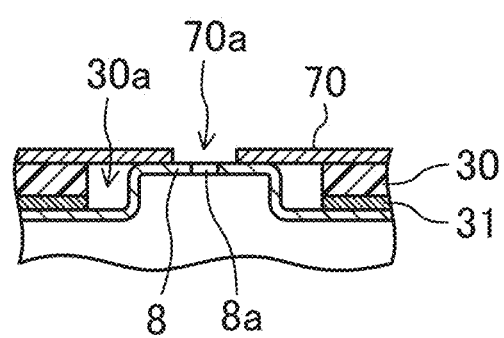

FIG.17
(a)
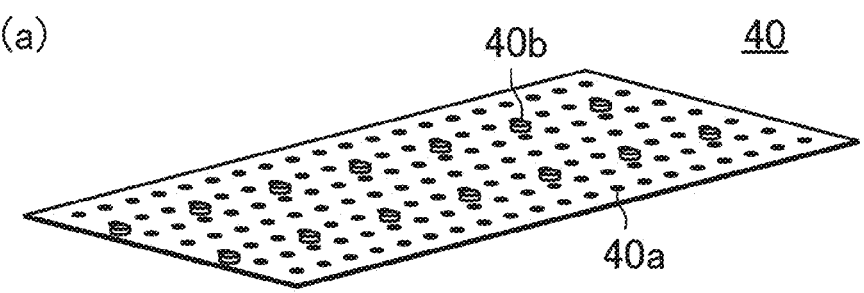
(b)
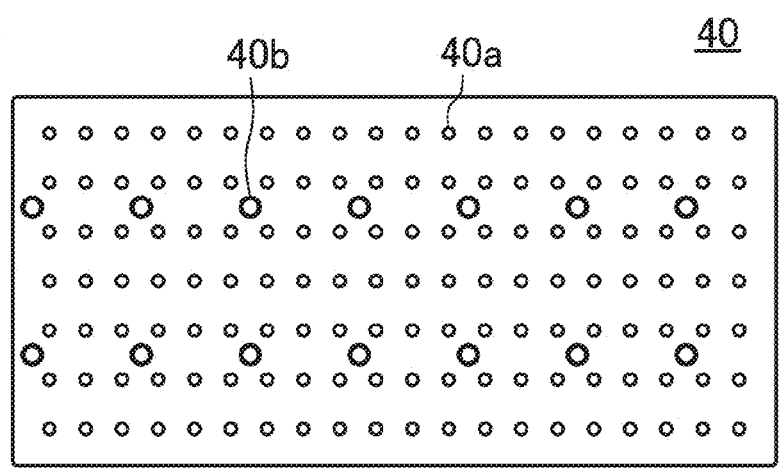

FIG.18
(a)
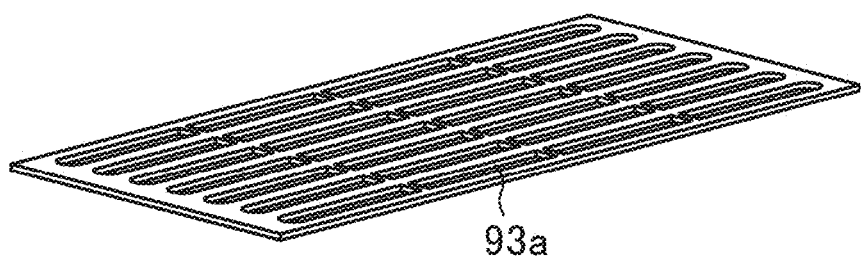
(b)
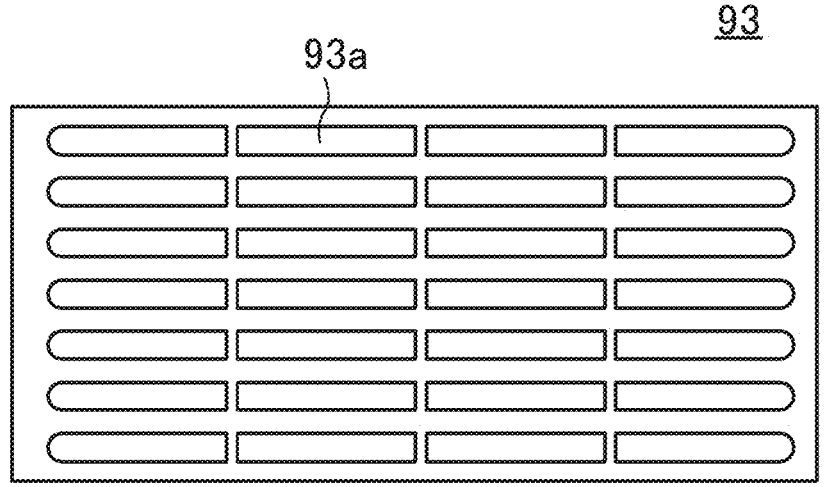

FIG.23
(a)
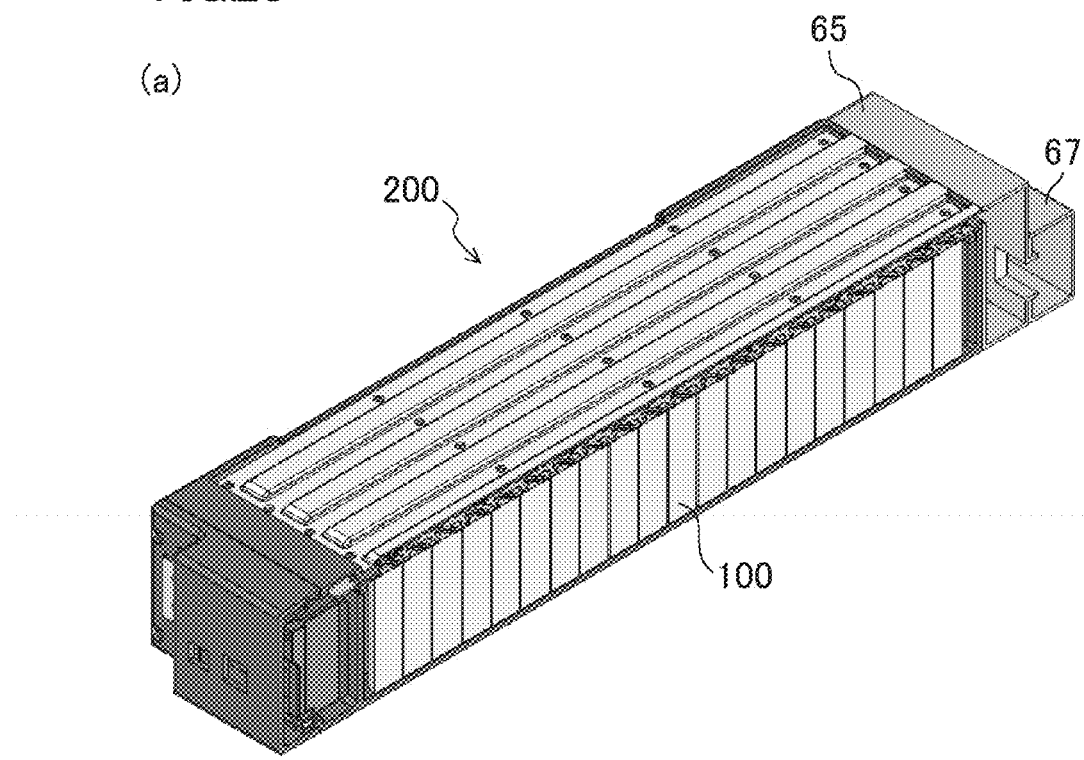
(b)
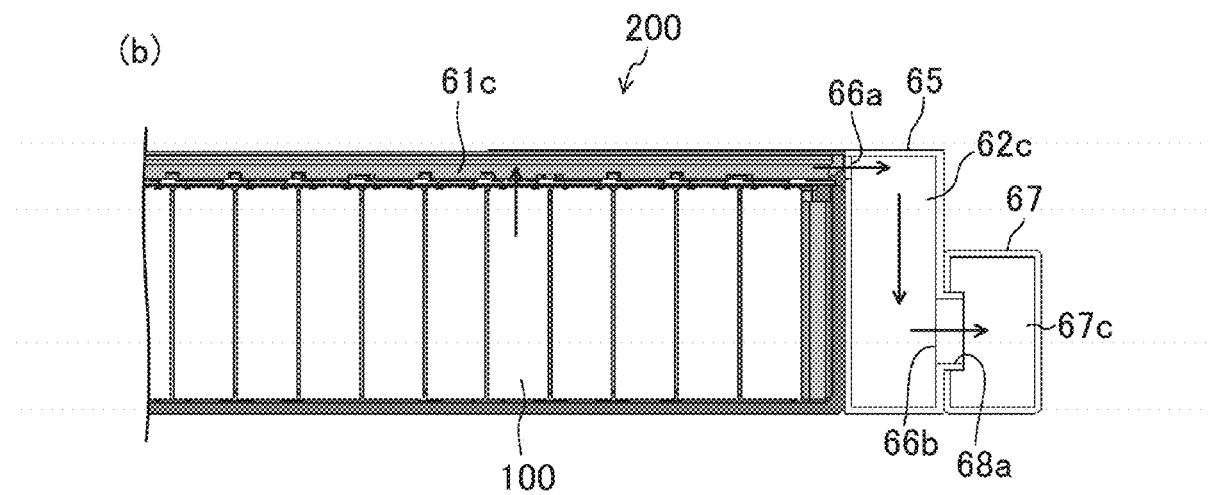

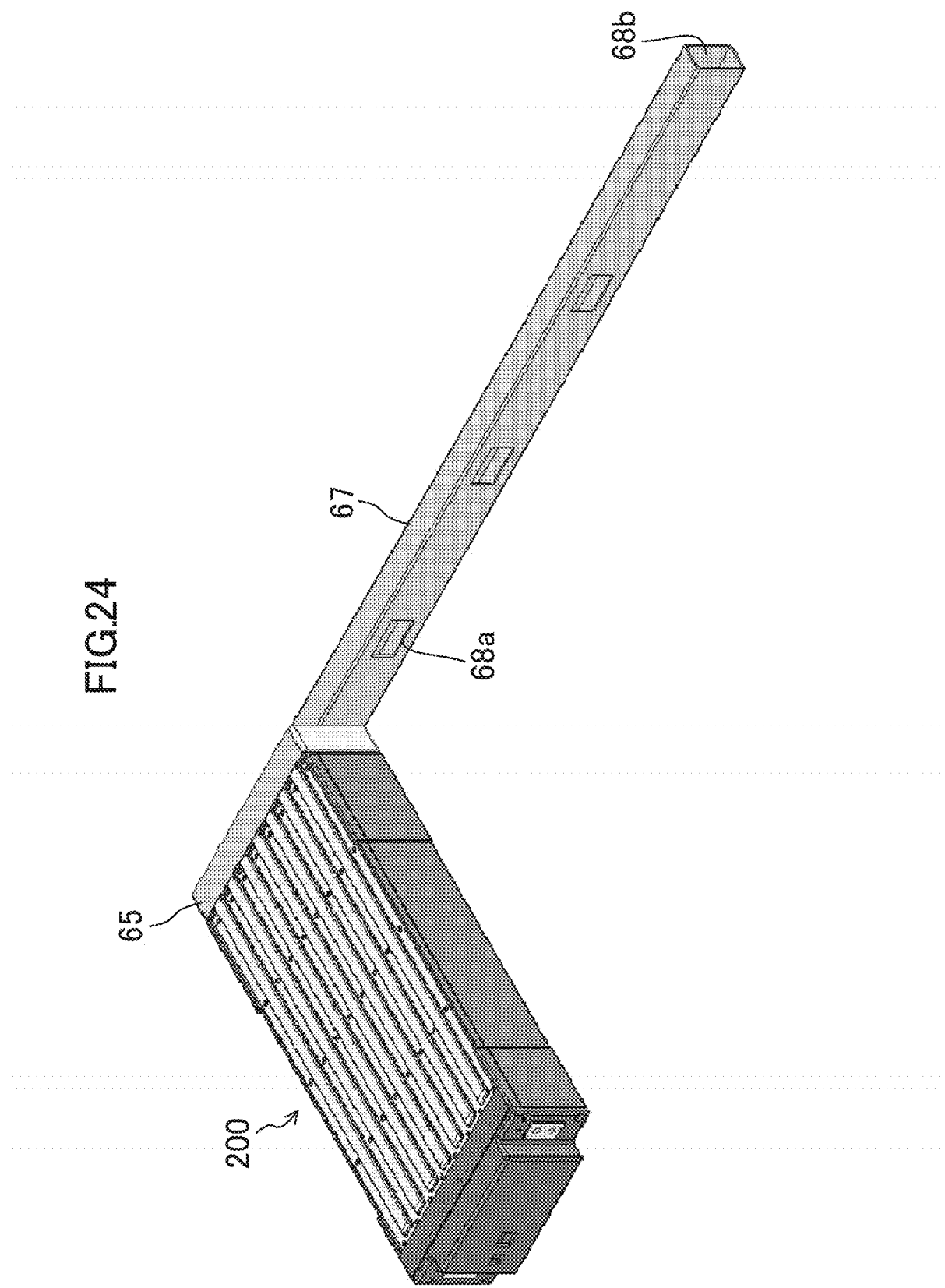

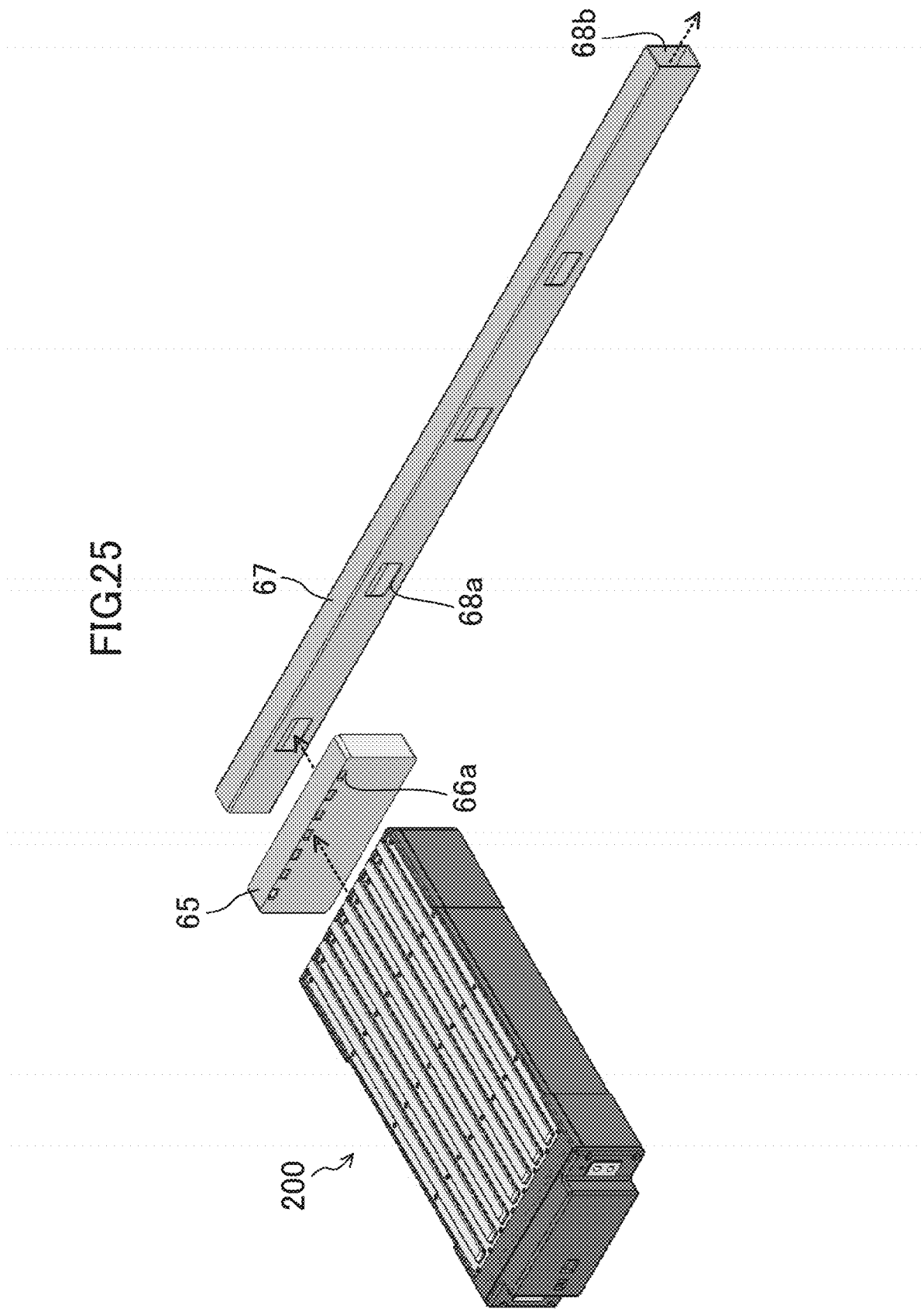

BATTERY MODULE

RELATED APPLICATIONS

This application is a Continuation of U.S. patent application Ser. No. 13/394,272, tiled March 5, 2012, which is based on the U.S. National Phase under 35 U.S.C. § 371 of International Application No. PCT/JP2010/004674, filed on Jul. 21, 2010, which in turn claims the benefit of Japanese Application No. 2009-216463, filed on Sep. 18, 2009, the disclosures of which Applications are incorporated by reference herein.

TECHNICAL FIELD

The present disclosure relates to battery modules in each of which a plurality of batteries are housed in a case, and more particularly to a battery module including a release mechanism for releasing a gas from a battery to outside the case with safety.

BACKGROUND ART

Battery packs in each of which a plurality of batteries are housed in a case so as to output a predetermined voltage and have a predetermined capacity are widely used as power sources for various equipment and vehicles. For these batteries packs, a technique of connecting general-purpose batteries in parallel or in series to form modules of battery assemblies each outputting a predetermined voltage and having a predetermined capacity and of variously combining such battery modules to cope with various applications. This module technique enables reduction in size and weight of battery modules by enhancing performance of batteries housed in battery modules, and therefore, has advantages such as improved workability in packaging battery packs and high flexibility in installing battery modules in limited space of vehicles or the like.

On the other hand, as the performance of batteries housed in battery modules has been enhanced, it has become more and more important to increase the safety of batteries modules as groups of batteries as well as the safety of batteries themselves. In particular, in a situation where a gas is generated by heat due to, for example, an internal short circuit in a battery and a safety valve actuates to release a high-temperature gas to outside the battery, when adjacent batteries are exposed to this high-temperature gas, normal batteries might also be affected, resulting in the possibility of a secondary degradation influenced by the abnormal battery.

To solve this problem, Patent Document 1 shows a power source device including a release mechanism in which a case housing a plurality of batteries is divided by a partition into a battery space housing the batteries and a release space through which a high-temperature gas from the batteries is released and in which openings of safety valves of the batteries communicate with an exhaust room. This configuration of the release mechanism allows a high-temperature gas from the safety valves of the batteries to flow into the exhaust space while preventing the high-temperature gas from flowing into the battery space, and to be released to outside the case through an outlet of the case. In this manner, it is possible to prevent adjacent batteries from being exposed to a high-temperature gas from an abnormal battery, thereby reducing a harmful influence on normal batteries.

CITATION LIST

Patent Document

Japanese Patent Publication No. 2007-27011

SUMMARY OF THE INVENTION

Technical Problem

The release mechanism shown in Patent Document 1 provides a hermetically sealed structure with the exhaust space, thereby preventing a gas which has flown into the release space through an opening of a battery from flowing into the battery space again. For this reason, this release mechanism is advantageous in preventing a secondary degradation of normal batteries.

However, a gas which has flown into the exhaust space can be at a high temperature of 1000° C. or more in some cases, and might react with oxygen to cause combustion. In this case, the exhaust space is exposed to a high temperature, and the batteries housed in the battery space still have the possibility of being affected by the high temperature.

It is therefore a major object of the present disclosure to provide a safe battery module capable of releasing a high-temperature gas from an abnormal battery to outside a case without an influence on other normal batteries.

Solution to the Problem

To achieve the above object, the present disclosure employs a configuration in which a case housing a plurality of cells is divided by a partition into two spaces: a housing space housing the cells and an exhaust duct for releasing a gas from the cells and in which the exhaust duct is further divided by a partition into two spaces. Openings through which a gas generated in the cells is released communicate with a first space, and the first space communicates with a second space through a through hole formed in the partition.

With this configuration, a gas from the vents of the cells is adiabatically expanded in the first space to have its temperature reduced to a temperature at which the gas does not cause combustion, and then is adiabatically expanded in the second space to have its temperature reduced to a temperature a temperature at which no significant problems occur even when the gas is released to outside the case. Accordingly, a high-temperature gas from an abnormal battery can be released to outside the case with safety without an influence on other normal batteries. As a result, a safe battery module can be achieved.

In other words, the volume of the first space is adjusted such that when a gas at a high temperature released from the vent of the cell to the first space by adiabatic expansion is released from the first space to the second space, this gas has a temperature equal to or lower than a temperature at which the gas does not cause combustion. The volume of the second space is adjusted such that when a gas released from the first space to the second space by adiabatic expansion is released from the second space to outside the case, this gas has a temperature equal to or lower than a temperature at which no significant problems occur even when the gas is released to outside the case.

A battery module in an aspect of the present disclosure is a battery module in which a plurality of cells are arranged and housed in a case. Each of the cells has a vent through which a gas generated in the cell is released to outside the cell. The case is divided, by a flat plate provided at same sides of the cells, into a housing space housing the cells and an exhaust duct for releasing a gas from the vents of the cells to outside the case. Each of the vents of the cells communicates with the exhaust duct through an opening formed in the flat plate. The exhaust duct is divided into a first space and a second space by a partition provided between the flat plate and an external plate or a bottom of the case. The first space communicates with the second space through a through hole formed in the partition. A gas from the vents of the cells is released to the first space through the opening formed in the flat plate, is guided to the second space through the through hole formed in the partition, and then is released to outside the case.

In a preferred embodiment, the flat plate separating the housing space and the exhaust duct from each other is a circuit board, and the circuit board includes a connection plate on which at least electrodes of the cells at one side are connected in parallel. Alternatively, the flat plate separating the housing space and the exhaust duct from each other may be a metal bus bar on which at least electrodes of the cells at one side are connected in parallel.

With these configurations, the flat plate provided to the same sides of the cells can additionally have a function of electrically connecting the cells, as well as a function of separating the housing space and the exhaust duct from each other. As a result, the size of the battery module can be reduced.

Advantages of the Invention

According to the present disclosure, a high-temperature gas from an abnormal battery can be released to outside a case without an influence on other normal batteries. As a result, a battery module with a high degree of safety can be obtained.

BRIEF DESCRIPTION OF THE DRAWINGS

FIGS. 5(a)-5(c) are partial cross-sectional views each showing a path of a gas released from vents of cells.

FIGS. 7(a) and 7(b) are views illustrating a connection structure among electrodes of cells, FIG. 7(a) is a disassembled perspective view, and FIG. 7(b) is an enlarged cross-sectional view illustrating a portion near positive electrode terminals of the cells.

FIGS. 17(a) and 17(b) show a structure of a partition, FIG. 17(a) is a perspective view, and FIG. 17(b) is a plan view.

FIGS. 18(a) and 18(b) show a structure of an intermediate panel, FIG. 18(a) is a perspective view, and FIG. 18(b) is a plan view.

FIG. 23(a) is a cross-sectional perspective view illustrating a configuration of a battery module, and FIG. 23(b) is a partial cross-sectional view of the battery module.

FIG. 24 is a perspective view in which a first exhaust duct and a second exhaust duct are in contact with one battery module.

FIG. 25 is a disassembled perspective view illustrating the structure shown in FIG. 24.

DESCRIPTION OF EMBODIMENTS

Embodiments of the present disclosure will be described hereinafter with reference to the drawings. The present disclosure is not limited to the following embodiments. Various changes and modifications may be made without departing from the scope of the present invention, and the following embodiments may be combined as necessary.

(First Embodiment)

Figure 1:
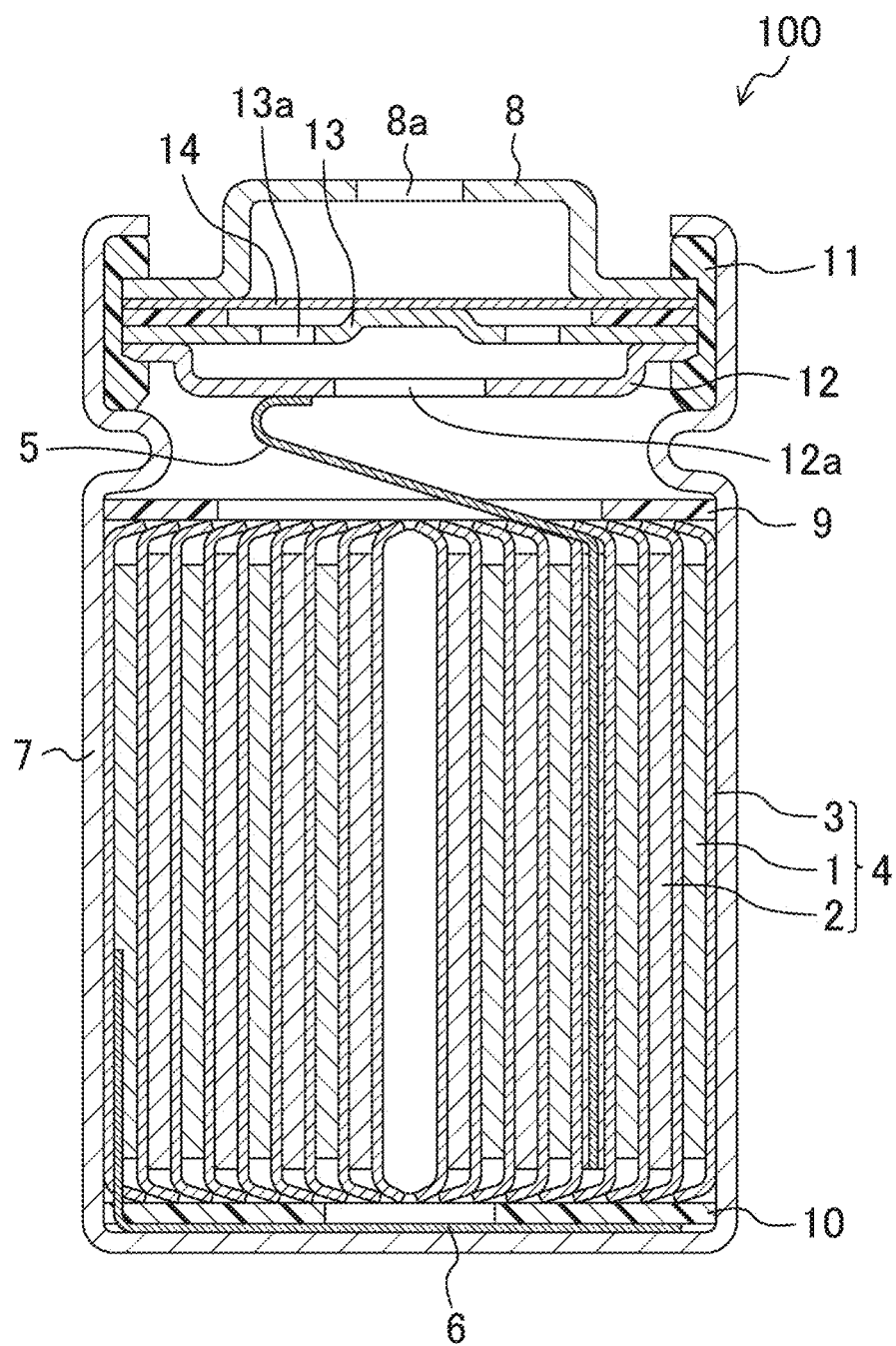
FIG. 1 is a cross-sectional view schematically illustrating a configuration of a battery for use in a battery module according to a first embodiment of the present disclosure.

FIG. 1 is a cross-sectional view schematically illustrating a configuration of a battery 100 to be used in a battery module according to a first embodiment of the present disclosure. A battery to be used in the battery module of the present disclosure may be a battery which can be used alone as a power source for mobile electronic equipment such as a laptop computer (and a battery to be used in a battery module will be referred to as a "cell" hereinafter). In this case, high-performance general-purpose battery can be used as a cell of a battery module, and thus, performance of the battery module can be more easily enhanced at lower cost.

As a cell 100 to be used in a battery module according to the present disclosure, a cylindrical lithium ion secondary battery as illustrated in FIG. 1 may be employed, for example. This lithium ion secondary battery has a general structure, and has a safety mechanism which releases gas to outside the battery when the pressure in the battery increases due to occurrence of, for example, an internal short circuit. The structure of the cell 100 will be specifically described with reference to FIG. 1.

As illustrated in FIG. 1, an electrode group 4 in which a positive electrode 1 and a negative electrode 2 are wound with a separator 3 interposed therebetween is housed in a battery case 7 together with a nonaqueous electrolyte. Insulating plates 9 and 10 are respectively placed on the top and bottom of the electrode group 4. The positive electrode 1 is joined to a filter 12 with a positive electrode lead 5 interposed therebetween. The negative electrode 2 is joined to the bottom of the battery case 7 also serving as a negative electrode terminal, with a negative electrode lead 6 interposed therebetween.

The filter 12 is connected to an inner cap 13 which has a projection joined to a metal safety valve 14. The valve 14 is connected to a terminal plate 8 also serving as a positive electrode terminal. The terminal plate 8, the valve 14, the inner cap 13, and the filter 12 serve as a unit, and seal an opening of the battery case 7 with a gasket 11 interposed therebetween.

When an internal short circuit, for example, occurs in the cell 100 to increase the pressure in the cell 100, the valve 14 bends toward the terminal plate 8. Then, when the inner cap 13 is disconnected from the valve 14, a current path is shut off. Thereafter, when the pressure in the cell 100 further increases, the valve 14 is broken. Accordingly, a gas generated in the cell 100 is released to the outside through a through hole 12a in the filter 12, a through hole 13a in the inner cap 13, the crack in the valve 14, and a vent (opening portion) 8a in the terminal plate 8 in this order.

The safety mechanism for releasing a gas generated in the cell 100 to the outside is not limited to the structure illustrated in FIG. 1, and may have other structures.

Figure 2:
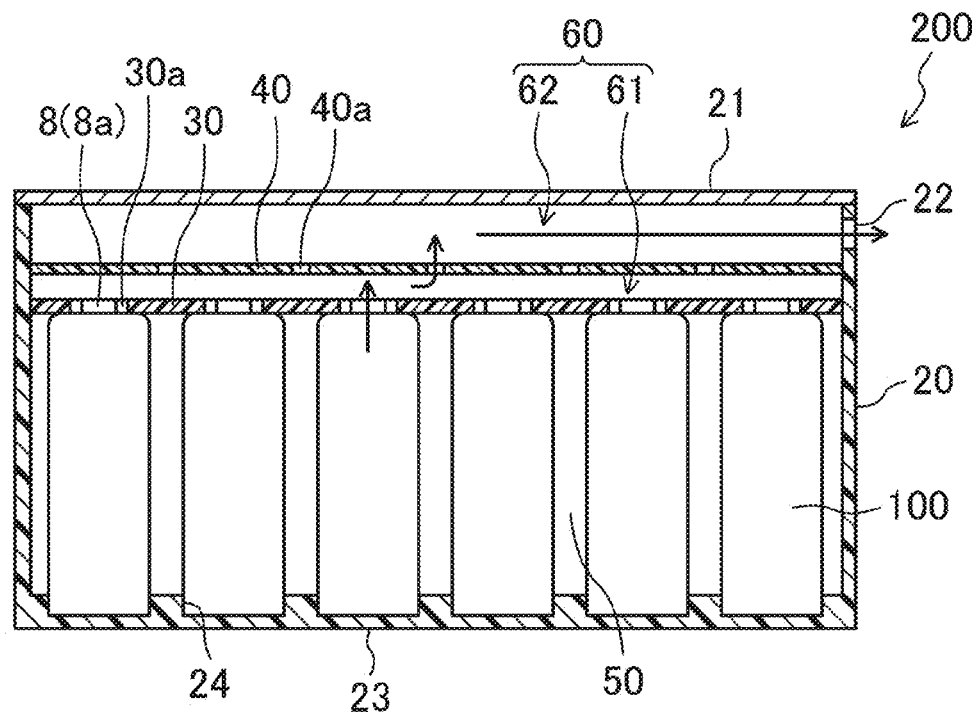
FIG. 2 is a cross-sectional view schematically illustrating a configuration of the battery module of the first embodiment.

FIG. 2 is a cross-sectional view schematically illustrating a structure of a battery module 200 according to this embodiment.

As illustrated in FIG. 2, a plurality of cells 100 are arranged, and housed in a case 20. The cells 100 are fixed at positions restricted by ribs 24 formed in the bottom 23 of the case 20. As illustrated in FIG. 1, each of the cells 100 includes the vent 8a for releasing a gas generated in the cell 100 to outside the cell 100.

The case 20 is divided into a housing space 50 housing a plurality of cells 100 and an exhaust duct 60 for releasing a gas from the vents 8a of the cells 100 to outside the case 20, by a flat plate 30 disposed at the same sides (toward the positive electrode terminals 8 in this embodiment) of the cells 100. The vents 8a of the cells 100 communicate with the exhaust duct 60 through openings 30a formed in the flat plate 30.

In the present disclosure, the exhaust duct 60 is divided, by a partition 40 placed between the flat plate 30 and an external plate (lid) 21 of the case 20, into a first space 61 defined between the partition 40 and the flat plate 30 and a second space 62 defined between the partition 40 and the external plate 21 of the case 20. The first space 61 communicates with the second space 62 through a through hole 40a formed in the partition 40.

The exhaust duct thus configured allows a gas from the vents 8a of the cells 100 to be released to the first space 61 through the openings 30a formed in the flat plate 30, guided to the second space 62 through the through holes 40a in the partition 40, and then released to outside the case 20 through a release outlet 22 provided in the case 20.

The flat plate 30 is in close contact with the same sides (i.e., toward the positive electrode terminals 8 in this embodiment) of the cells 100, and thus, the housing space 50 is hermetically sealed by the flat plate 30. Accordingly, a gas released to the first space 61 from the vents 8a of the cells 100 through the openings 30a of the flat plate 30 does not return to the housing space 50 again.

Figure 3:
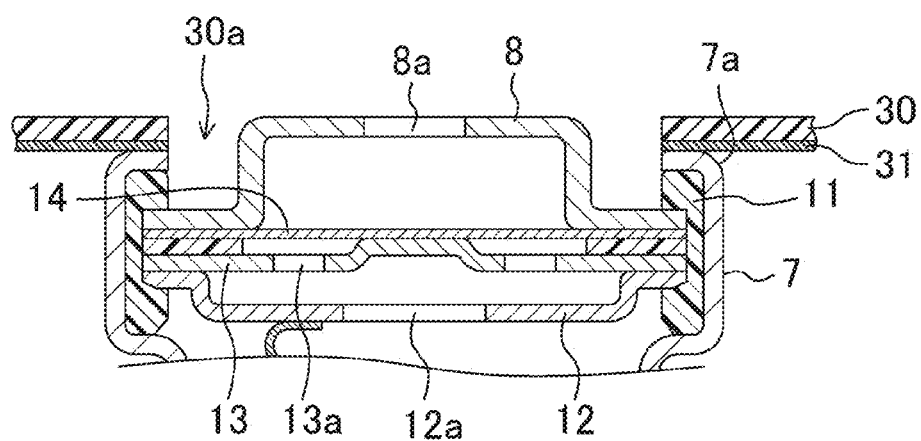
FIG. 3 is an enlarged cross-sectional view illustrating a portion near an end of a cell to which a flat plate is provided.

FIG. 3 is an enlarged cross-sectional view illustrating a portion near an end of a cell 100 to which the flat plate 30 is provided. As illustrated in FIG. 3, in a state where the projection of the positive electrode terminal 8 is inserted in the opening 30a of the flat plate 30, a shoulder 7a of the battery case 7 and the flat plate 30 are in close contact with each other with the elastic member 31 interposed therebetween. Accordingly, a gas released from the vent 8a formed in the projection of the positive electrode terminal 8 does not return to the housing space again because the housing space of the cell 100 is hermetically sealed by the flat plate 30. The elastic member 31 may be adhesive. In this case, the cell 100 can be held by the flat plate 30. The flat plate 30 may be in direct contact with the shoulder 7a of the battery case 7 with the elastic member 31 not interposed therebetween.

Figure 4:
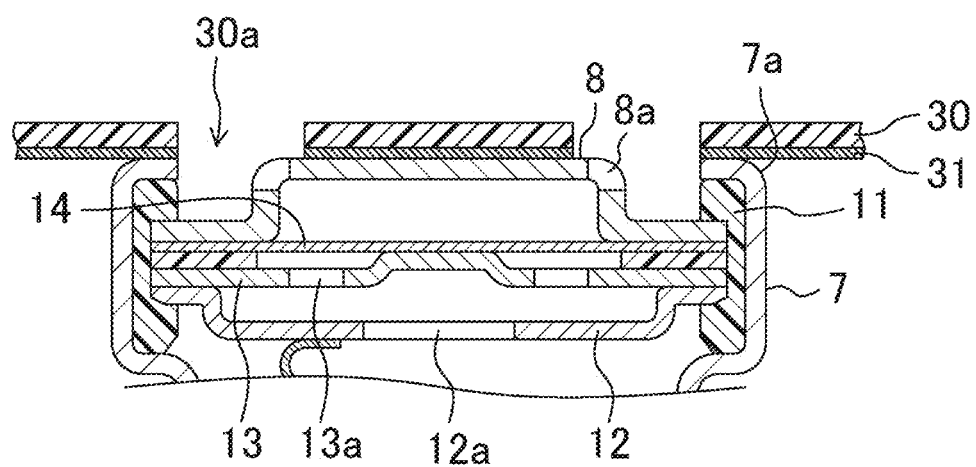
FIG. 4 is a partial cross-sectional view showing a positional relationship between the cell and the flat plate in a case where a vent of the cell is formed in a side of a projection of a positive electrode terminal.

FIG. 4 is a partial cross-sectional view showing a positional relationship between the cell 100 and the flat plate 30 in a case where a vent 8a of the cell 100 is formed in a side of the projection of the positive electrode terminal 8. In this case, the opening 30a formed in the flat plate 30 has a ring shape, and thus, the battery case 7 and the flat plate 30 can be in close contact with each other even on a flat portion of the projection of the positive electrode terminal 8. This configuration allows the elastic member to be adhesive, thereby further enhancing the function of holding the cell 100.

The "flat plate 30" herein is not necessarily flat, and may be a plate having unevenness according to the shape of the battery case 7, for example, as long as the plate is flat as a whole.

The state of being "hermetically sealed" herein does not necessarily mean a state of being completely sealed, and includes a sealed state in which a negligible amount of gas returns from the exhaust duct 60 to the housing space 50.

Next, advantages obtained by dividing the exhaust duct 60 of the present disclosure into the first space 61 and the second space 62 will be described.

A gas released from the vents 8a of the cells 100 to the exhaust duct 60 is adiabatically expanded in the exhaust duct 60, thereby causing a decrease in temperature of the gas. However, since the gas released from the vents 8a of the cells 100 can be at a temperature of 1000° C. or more in some cases, if the temperature of the adiabatically expanded gas does not decrease to a temperature at which the gas does not react with oxygen, the gas might react with ambient oxygen to cause combustion.

The gas temperature decrease due to adiabatic expansion depends on the capacity of the exhaust duct. Since the gas released to the exhaust duct is released to outside the case 20 while pushing oxygen in the exhaust duct out, the amount of a gas which reacts with oxygen to cause combustion during adiabatic expansion depends on the volume of the exhaust duct (i.e., the amount of oxygen). Accordingly, to prevent a gas released from the vents 8a of the cells 100 from reacting with oxygen to continuously cause combustion, it is necessary to cause adiabatic expansion in an exhaust duct whose volume is as small as possible so as to reduce the gas temperature to a temperature at which the gas does not react with oxygen. To satisfy this necessity, the volume of the exhaust duct needs to be controlled near the vents 8a of the cells 100 through which a high-temperature gas is released.

The first space 61 of the present disclosure is provided to achieve the control described above. The volume of the first space 61 is adjusted such that when a gas at a high temperature released from the vent 8a of the cell 100 to the first space 61 by adiabatic expansion is released from the first space 61 to the second space 62, this gas has a temperature equal to or lower than a temperature at which the gas does not react with oxygen.

The volume of the first space 61 can be appropriately adjusted in consideration of performance of the cells 100 to be used, the type of an electrolyte (i.e., the type of a gas to be generated). In addition, the volume of the first space 61 for achieving the temperature described above may be obtained through a simulation using a model of adiabatic expansion, or may be obtained through various experiments. Specifically, as an example of a simple experiment, the vent 8a of the cell 100 is formed to have a space having a certain volume, and a release outlet from this space to the atmosphere is provided. Then, a nail is driven in the battery case 7 of the cell 100 to cause an internal short circuit as a simulation, resulting in gushing of a high-temperature gas from the vent 8a. By selecting the volume of the space, the gas otherwise gushing from the release outlet with a spark and fire can be changed into smoke in a state in which fire has been extinguished. In this manner, the volume of the first space 61 can be determined.

The first space 61 communicates with the second space 62 through the through holes 40a formed in the partition 40. Accordingly, the location of the through holes 40a affects a path through which a high-temperature gas from the vents 8a of the cells 100 flows from the first space 61 to the second space 62. In view of this, the volume of the first space 61 may be further adjusted in consideration of the location of the through holes 40a.

Specifically, although not shown, the space 61 is not open but closed in the lateral direction in FIG. 5(a). Accordingly, as illustrated in FIG. 5(a), in a case where the through holes 40a are arranged at the same pitch as the cells 100, a path through which a high-temperature gas from the vents 8a of the cells 100 flows from the first space 61 to the second space 62 is a path indicated by arrows in most part. Thus, the first space 61 is expected to be substantially controlled by a space in the range indicated by A. In addition, as illustrated in FIG. 5(b), in a case where the through holes 40a are arranged at a pitch wider than that of the cells 100, a path through which a high-temperature gas from the vents 8a of the cells 100 flows from the first space 61 to the second space 62 is a path indicated by arrows in most part. Thus, the first space 61 is expected to be substantially controlled by a space in the range indicated by B.

In this manner, the location of the through holes 40a can substantially control the volume of the first space 61. Alternatively, as illustrated in FIG. 5(c), the volume of the first space 61 may be controlled by further dividing the first space into a plurality of subspaces 63 by side walls 41.

The control of the first space 61 is not strictly defined. Effective advantages of the present disclosure can be achieved by dividing the exhaust duct 60 into the first space 61 and the second space 62 to adjust the volume of the first space 61 communicating with the vents 8a of the cells 100.

On the other hand, the volume of the second space 62 is adjusted such that when a gas released from the first space 61 to the second space 62 by adiabatic expansion is released from the second space 62 to outside the case 20, the gas has a temperature equal to or lower than a temperature at which no significant problems occur even when the gas is released to outside the case. Since the gas released from the space 61 to the second space 62 is changed to be at a temperature at which the gas does not react with oxygen in the first space 61, the possibility of combustion of the gas is eliminated in the second space 62. Accordingly, unlike the first space 61, the second space 62 does not need to have a volume as small as possible for adiabatic expansion, and is allowed to have a relatively large volume as compared to the first space. In addition, each of the external plate 21 and the partition 40 may be made of a material having a high thermal conductivity, such as aluminium or iron. In this case, an advantage of a temperature decrease by conduction of heat can be achieved in addition to an advantage of a temperature decrease by adiabatic expansion.

In this embodiment, the exhaust duct 60 is divided into the first space 61 and the second space 62. Alternatively, to control a temperature decrease of a gas by adiabatic expansion, the exhaust duct 60 may be divided into three or more spaces by a plurality of partitions.

The second space 62 is not necessarily formed between the partition 40 and the case 20. For example, the second space 62 may be placed between the partition 40 and a second partition provided between the partition 40 and the external plate 21. In this case, the space formed between the second partition and the external plate may be a flow path through which a refrigerant flows. This configuration can more efficiently reduce the temperature of a gas in the second space 62.

In this embodiment, the vents 8a of the cells 100 are formed in projections (flat portions or sides) of the positive electrode terminals 8, but may be formed in the bottoms of the battery case 7 serving as the negative electrode terminals. In this case, the flat plate 30 is provided toward the negative electrode terminals of the cells 100, and the exhaust duct 60 is formed between the flat plate 30 and the bottom of the case 20. The vents 8a formed in the bottoms of the battery cases 7 communicate with the exhaust duct 60 through the openings 30a formed in the flat plate 30.

(Variation of First Embodiment)

As illustrated in FIG. 2, in the first embodiment, the exhaust duct 60 is separated from the housing space 50 by a plate disposed at the same sides (i.e., toward the positive electrode terminals or the negative electrode terminals) of the cells 100. This configuration is obtained by arranging the cells 100 in the case 20 with the polarities of the cells 100 oriented in the same direction.

Figure 6:
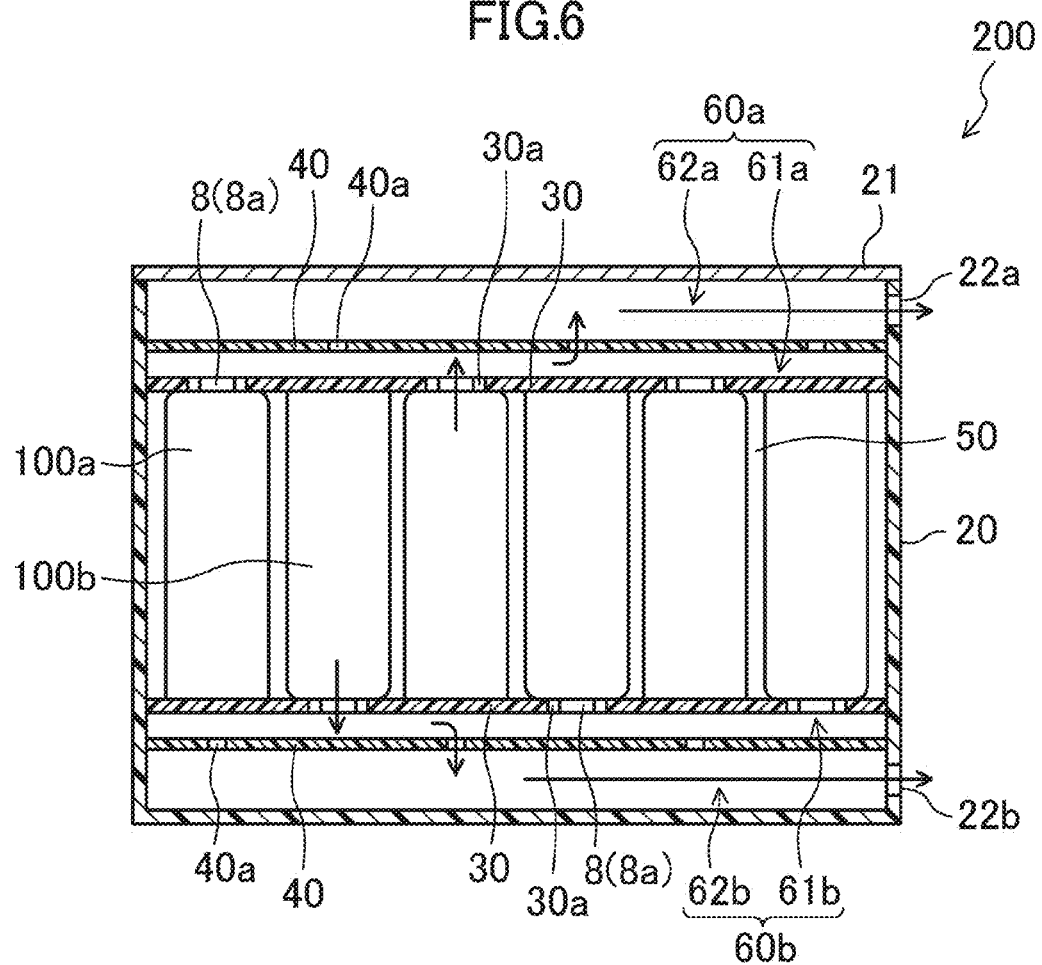
FIG. 6 is a cross-sectional view schematically illustrating a configuration of a battery module 200 according to a variation of the first embodiment.

FIG. 6 is a cross-sectional view schematically illustrating a configuration of the battery module 200 according to a variation of the first embodiment. As illustrated in FIG. 6, this variation is different from the first embodiment in that the cells 100 are arranged with their polarities alternately oriented in opposite directions.

As illustrated in FIG. 6, the cells 100 are housed in the case 20 in such a manner that the positions of the positive electrode terminals 8 alternate between the top and the bottom, specifically, the positive electrode terminal 8 of the cell 100a is positioned at the top and the positive electrode terminal 8 of the cell 100b adjacent to the cell 100a is positioned at the bottom. In this variation, the vents 8a from which a gas generated in the cells 100 is released are formed in the projections of the positive electrode terminals 8.

The flat plate 30 separating the housing space 50 and the exhaust duct 60 is disposed at each end of each of the cells 100, resulting in that the exhaust duct 60 is formed as two exhaust ducts 60a and 60b respectively located at the bottom and the top of the case 20 and sandwiching the housing space 50. Each of the vents 8a of the cells 100 communicates with one of the exhaust ducts 60a and 60b through the opening 30a formed in the flat plate 30.

The exhaust duct 60a at the top of the case 20 is divided, by a partition 40 placed between the flat plate 30 and the external plate 21 of the case 20, into a first space 61a formed between the partition 40 and the flat plate 30 and a second space 62a formed between the partition 40 and the external plate 21 of the case 20. The first space 61a communicates with the second space 62a through the through holes 40a formed in the partition 40.

In the same manner, the exhaust duct 60b at the bottom of the case 20 is divided, by a partition 40 placed between the flat plate 30 and the bottom 23 of the case 20, into a first space 61b formed between the partition 40 and the flat plate 30 and a second space 62b formed between the partition 40 and the bottom 23 of the case 20. The first space 61b communicates with the second space 62b through the through holes 40a formed in the partition 40.

In a manner similar to that in the first embodiment, a gas is released from the vents 8a of the cells 100 to the first space 61a, 61b through the openings 30a formed in the flat plate 30, is guided to the second space 62a, 62b through the through holes 40a formed in the partition 40, and then is released to outside the case 20 through the release outlet 22 provided in the case 20.

In this variation, advantages obtained by dividing each of the exhaust ducts 60a and 60b into the first space 61a, 61b and the second space 62a, 62b are similar to those in the first embodiment.

In this variation, two exhaust ducts 60a and 60b are provided. Accordingly, the height of the case 20 increases to cause an increase in the volume of the battery module 200. However, since the cells 100 are arranged with their polarities alternatively oriented in opposite directions, the connection plate can be advantageously formed to be in the shape of a simple plate in connecting the cells 100 in series.

(Second Embodiment)

In the first embodiment, the housing space 50 housing the cells 100 and the exhaust duct 60 for releasing a gas from the vents 8a of the cells 100 are separated from each other by the flat plate 30. The flat plate 30 may have a function of electrically connecting the electrodes of the cells 100.

In this embodiment, this function of the flat plate 30 of electrically connecting the electrodes of the cells 100 will be described. The connection structure among the electrodes of the cells 100 described in this embodiment does not limit the release mechanism described in the first embodiment. In the following description, description of the housing space 50 of the cells 100 and the exhaust duct 60 will not be repeated.

FIGS. 7(a) and 7(b) are views illustrating a connection structure among the electrodes of the cells 100 connected in a line (hereinafter referred to as a "battery assembly"). Specifically, FIG. 7(a) is a disassembled perspective view, and FIG. 7(b) is an enlarged cross-sectional view illustrating a portion near positive electrode terminals 8 of the cells 100.

As illustrated in FIG. 7(a), a positive electrode connection plate 70 and a negative electrode connection plate 73 are formed on the surface of a circuit board 30, and openings 70a are formed in the positive electrode connection plate 70. In addition, openings 30a are formed in the circuit board 30. Negative electrode terminals of the cells 100 (i.e., the bottoms of the battery cases) are connected in parallel by a negative electrode bus bar 81, and are connected to the negative electrode connection plate 73 on the circuit board 30 through a conductive part 72 extending from the negative electrode bus bar 81. In this manner, the cells 100 are connected in parallel by the positive electrode connection plate 70 and the negative electrode connection plate 73 formed on the circuit board 30.

In addition, as illustrated in FIG. 7(b), projections of positive electrode terminals 8 of the cells 100 are inserted in the openings 30a of the circuit board 30 to be connected to the positive electrode connection plate 70 formed on the circuit board 30. At this time, the circuit board 30 is brought into contact with the battery cases with an elastic member 31 interposed therebetween. The vents 8a of the cells 100 communicate with an exhaust duct (not shown) through the openings 70a of the positive electrode connection plate 70. In this manner, a gas from the vents 8a of the cells 100 is released to the exhaust duct through openings 30a formed in the circuit board 30. In addition, since the circuit board 30 hermetically seals a housing space (not shown) for the cells 100, the gas released to the exhaust duct does not return to the housing space again.

The flat plate 30 having the function of electrically connecting the electrodes of the cells 100 is not necessarily a circuit board made of an insulating member, and may be a connection plate made of a metal member (hereinafter referred to as a "metal bus bar").

The connection structure among the electrodes of the cells 100 using a metal bus bar will be described hereinafter with reference to FIGS. 8-14.

Figure 8:
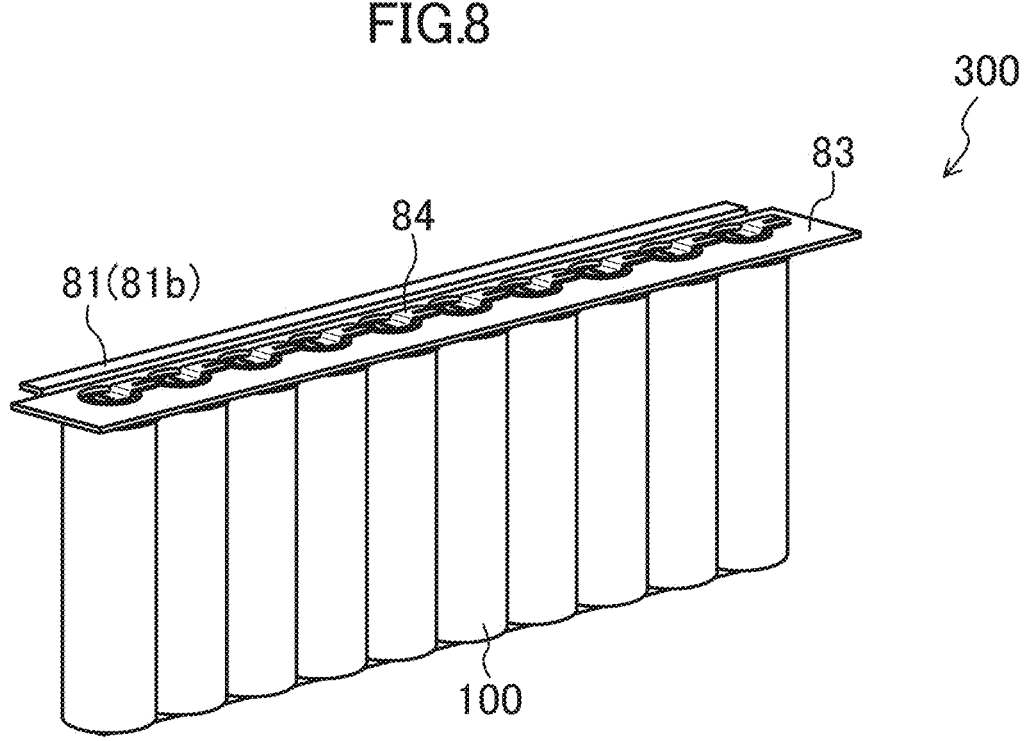
FIG. 8 is a perspective view illustrating a battery assembly according to a second embodiment of the present disclosure.
Figure 9:
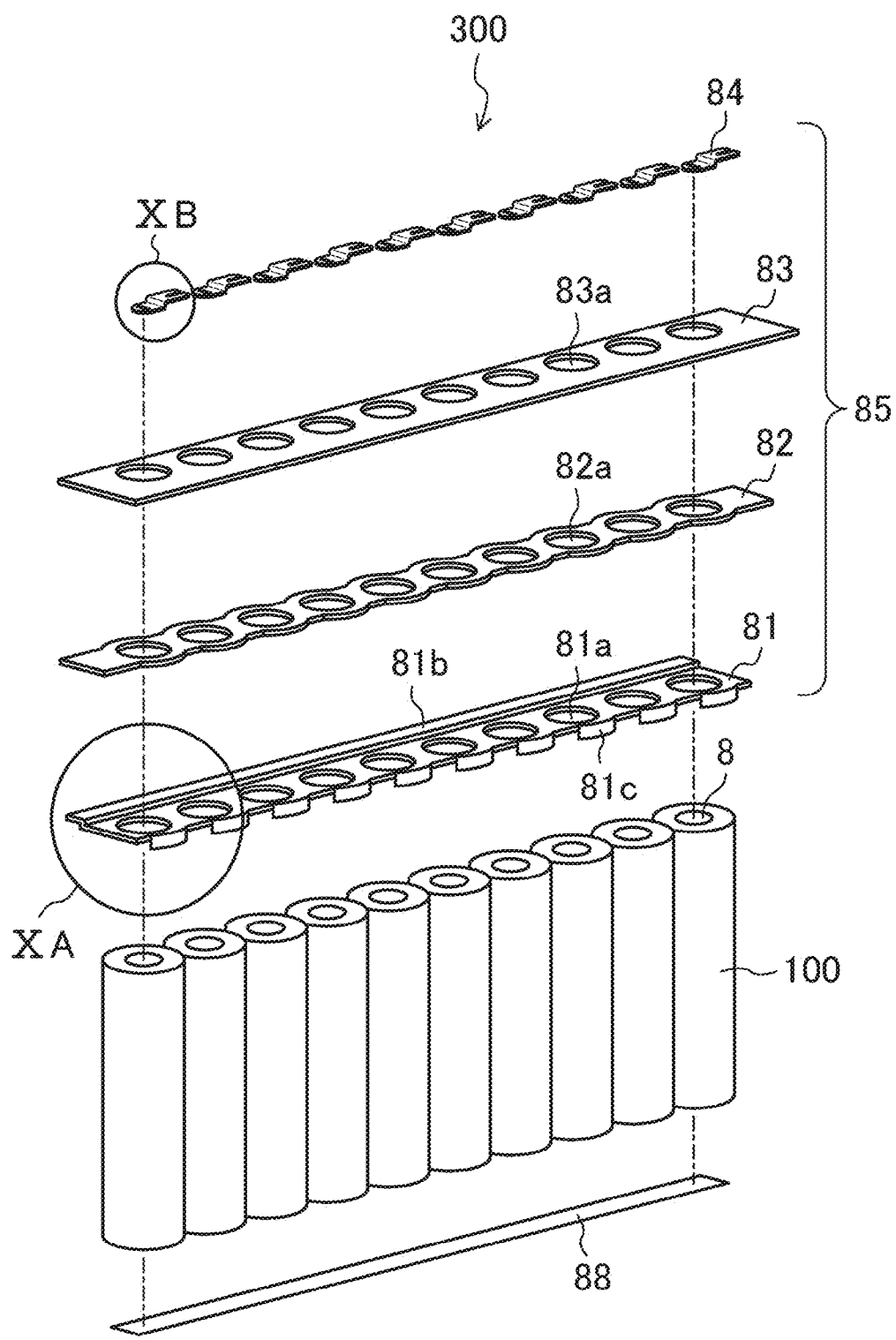
FIG. 9 is a disassembled perspective view illustrating the battery assembly of the second embodiment.

FIG. 8 is a perspective view illustrating a battery assembly 300 according to this embodiment. FIG. 9 is a disassembled perspective view illustrating the battery assembly 300. The battery cases of the cells 100 are exposed in this embodiment. Accordingly, in the cells 100, not only the bottom surfaces of the battery cases but also side surfaces and top surfaces thereof can serve as negative electrode terminals.

As illustrated in FIG. 9, the positive electrode bus bar 83 and the negative electrode bus bar 81 connecting the positive electrodes and the negative electrodes of the cells 100 in parallel are in contact with the battery cases with the insulating plate 82 interposed between of the battery case and the bus bars 83 and 81 at the side of the positive electrode terminals of the cells 100. The positive electrode terminals 8 of the cells 100 are connected to the positive electrode bus bar 83 through positive electrode connection strips 84.

In this manner, a connection group 85 including the negative electrode bus bar 81, the insulating plate 82, the positive electrode bus bar 83, and the connection strips 84 is locally placed at the side of the positive electrode terminals 8 of the cells 100, thereby further reducing the size of the battery assembly 300. In addition, the negative electrode bus bar 81 and the positive electrode bus bar 83 have specific shapes, which will be described later. With this configuration, when battery assemblies 300 in each of which cells 100 are connected in parallel are arranged to form a group of battery assemblies (see FIG. 13), these battery assemblies 300 can be easily connected in series using the connection groups 85.

Figure 10:
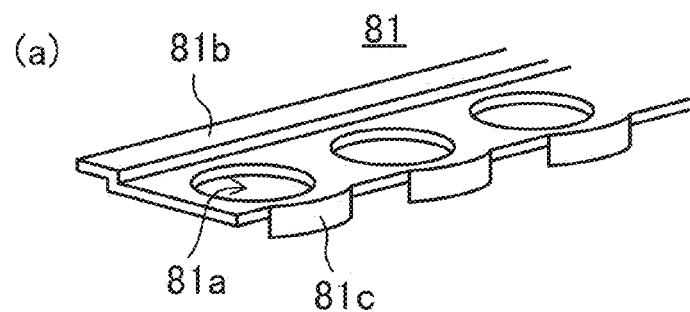
FIGS. 10(a) and 10(b) are enlarged views illustrating a region XA and a region XB, respectively, shown in FIG. 9.
Figure 11:
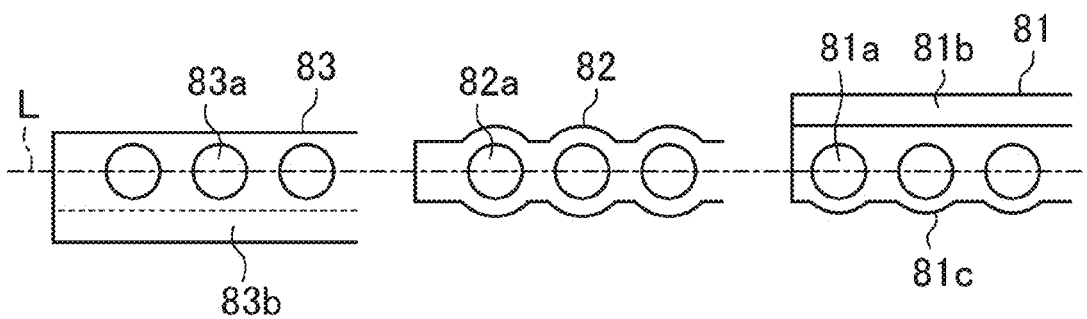
FIG. 11 shows plan views illustrating a negative electrode bus bar, an insulating plate, and a positive electrode bus bar, respectively, constituting a connection group.
Figure 12:
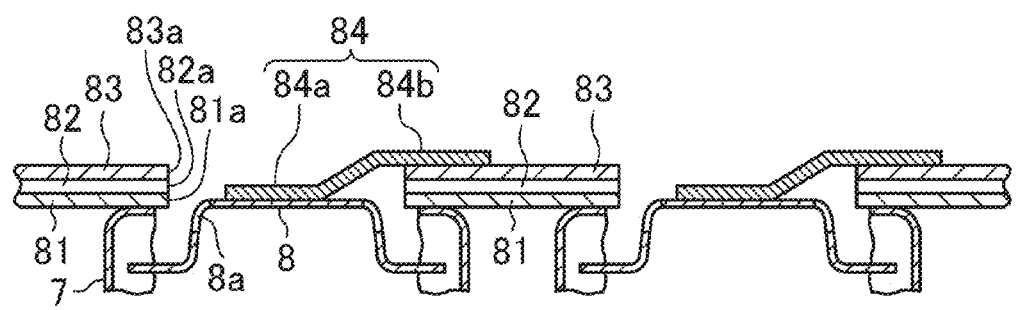
FIG. 12 is a partial cross-sectional view in which adjacent cells are connected in parallel.

Configuration of the connection group 85 will be described in detail with reference to FIGS. 10-12. FIGS. 10(a) and 10(b) are enlarged views illustrating a region XA and a region XB, respectively, shown in FIG. 9. FIG. 11 shows plan views illustrating the negative electrode bus bar 81, the insulating plate 82, and the positive electrode bus bar 83, respectively, constituting the connection group 85. FIG. 12 is a partial cross-sectional view in which adjacent cells 100 are connected in parallel.

The negative electrode bus bar 81 is, for example, a nickel plate having a thickness of 0.2 mm, and is configured to be in contact with the battery cases (i.e., the negative electrode terminals) of the cells 100 constituting the battery assembly 300. As illustrated in FIG. 10(a), this negative electrode bus bar 81 has a stepped portion 81b extending along the longitudinal direction, and through holes 81a and negative electrode connection strips 81c are arranged to be spaced from one another along the longitudinal direction. As illustrated in FIG. 12, when the negative electrode bus bar 81 is brought into contact with the battery cases, the positive electrode terminals 8 of the cells 100 are exposed in the through holes 81a. The negative electrode connection strips 81c are welded to the outer peripheries of the battery cases to be fixed to the battery cases. The bottoms (i.e., the negative electrode terminals) of the battery cases of the cells 100 may be connected in parallel by another metal bus bar 88. In this case, the cells 100 can also be fixed.

The positive electrode bus bar 83 is, for example, a copper plate having a thickness of about 1 mm, and is provided on the negative electrode bus bar 81 with the insulating plate 82 interposed therebetween. As illustrated in FIG. 11, the positive electrode bus bar 83 and the insulating plate 82 respectively have through holes 83a and 82a. The through holes 83a are spaced from one another along the longitudinal direction, and the through holes 82a are also spaced from one another along the longitudinal direction. The through holes 81a, 82a, and 83a of the negative electrode bus bar 81, the insulating plate 82, and the positive electrode bus bar 83 communicate with one another. In this manner, as illustrated in FIG. 12, the positive electrode terminals 8 of the cells 100 are exposed in the through holes 81a, 82a, and 83a.

Each of the positive electrode connection strips 84 is, for example, a nickel plate having a thickness of 0.2 mm, and as illustrated in FIG. 10(b), has a first connection strip 84a, a second connection strip 84b, and a stepped portion 84c. The first connection strip 84a and the second connection strip 84b sandwich the stepped portion 84c, and have different heights. As illustrated in FIG. 12, the first connection strips 84a are connected to the positive electrode terminals 8 of the cells 100, and the second connection strips 84b are connected to the upper surface of the positive electrode bus bar 83. In this manner, the positive electrode terminals 8 of the cells 100 are connected to the positive electrode bus bar 83 through the positive electrode connection strips 84.

Then, the connection structure among the electrodes in a case where a plurality of battery assemblies 300 illustrated in FIG. 8 are arranged to form a group of the battery assemblies will be described.

Figure 13:
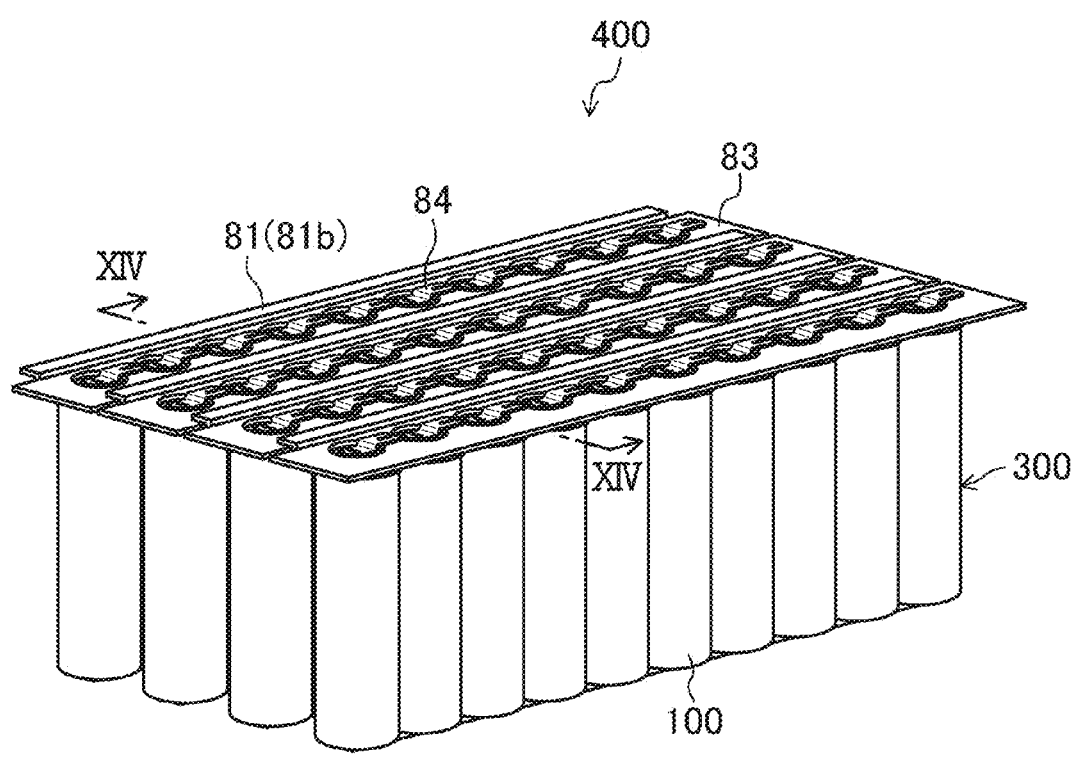
FIG. 13 is a perspective view illustrating a configuration of a group of battery assemblies in each of which cells are connected in parallel.
Figure 14:
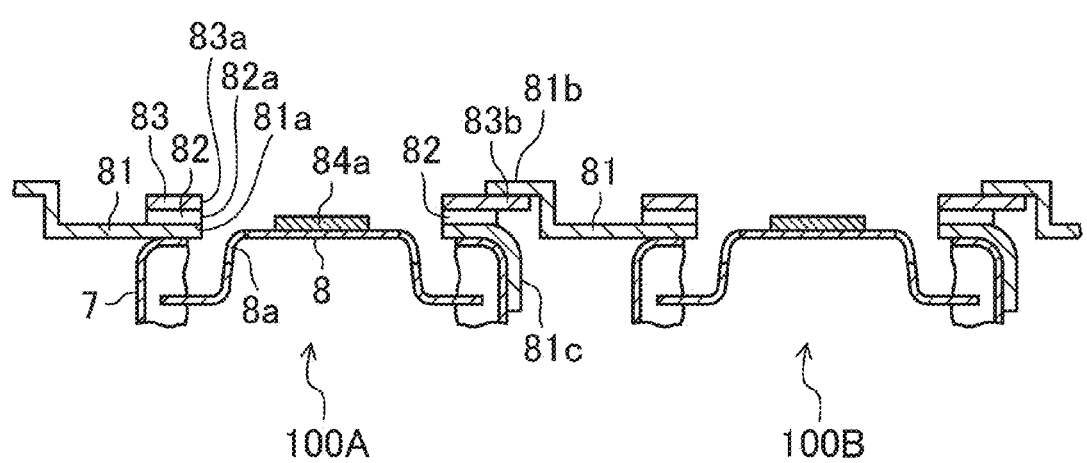
FIG. 14 is a partial cross-sectional view illustrating a connection structure between two cells and taken along the line XIV-XIV in FIG. 13.

FIG. 13 is a perspective view illustrating a configuration of a group of four battery assemblies 300 in each of which 10 cells 100 are connected in parallel. FIG. 14 is a partial cross-sectional view illustrating a connection structure between two cells 100 and taken along the line XIV-XIV in FIG. 13.

As illustrated in FIG. 14, the negative electrode bus bar 81 and the positive electrode bus bar 83 are in contact with the battery cases 7 of the cells 100 with the insulating plate 82 interposed therebetween. In this configuration, as illustrated in FIG. 11, an end 83b of the positive electrode bus bar 83 in the lateral direction and the stepped portion 81b of the negative electrode bus bar 81 in the lateral direction project in opposite directions with respect to a center line L connecting the centers of the through holes 83a, 82a, and 81a. Accordingly, in adjacent cells 100A and 100B illustrated in FIG. 14, the end 83b of the positive electrode bus bar 83 in the cell 100A and the stepped portion 81b of the negative electrode bus bar 81 in the cell 100B overlap each other, thereby connecting the cell 100A and the cell 100B to each other in series.

(Specific Example of Battery Module)

A specific example of application of the configuration of the battery module of this embodiment will be described with reference to FIGS. 15-19.

Figure 15:
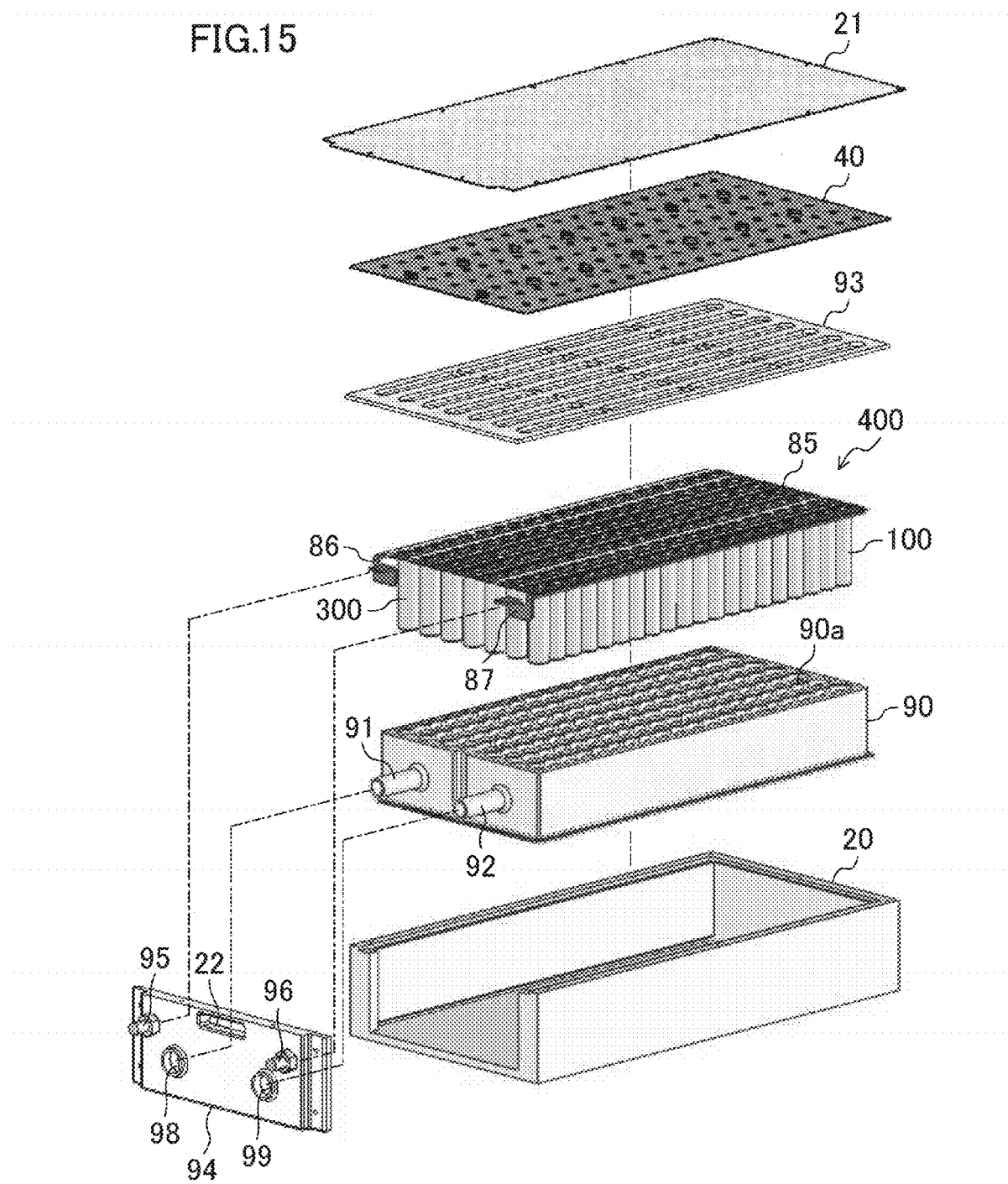
FIG. 15 is a disassembled perspective view illustrating a battery module according to a specific example of the present disclosure.
Figure 16:
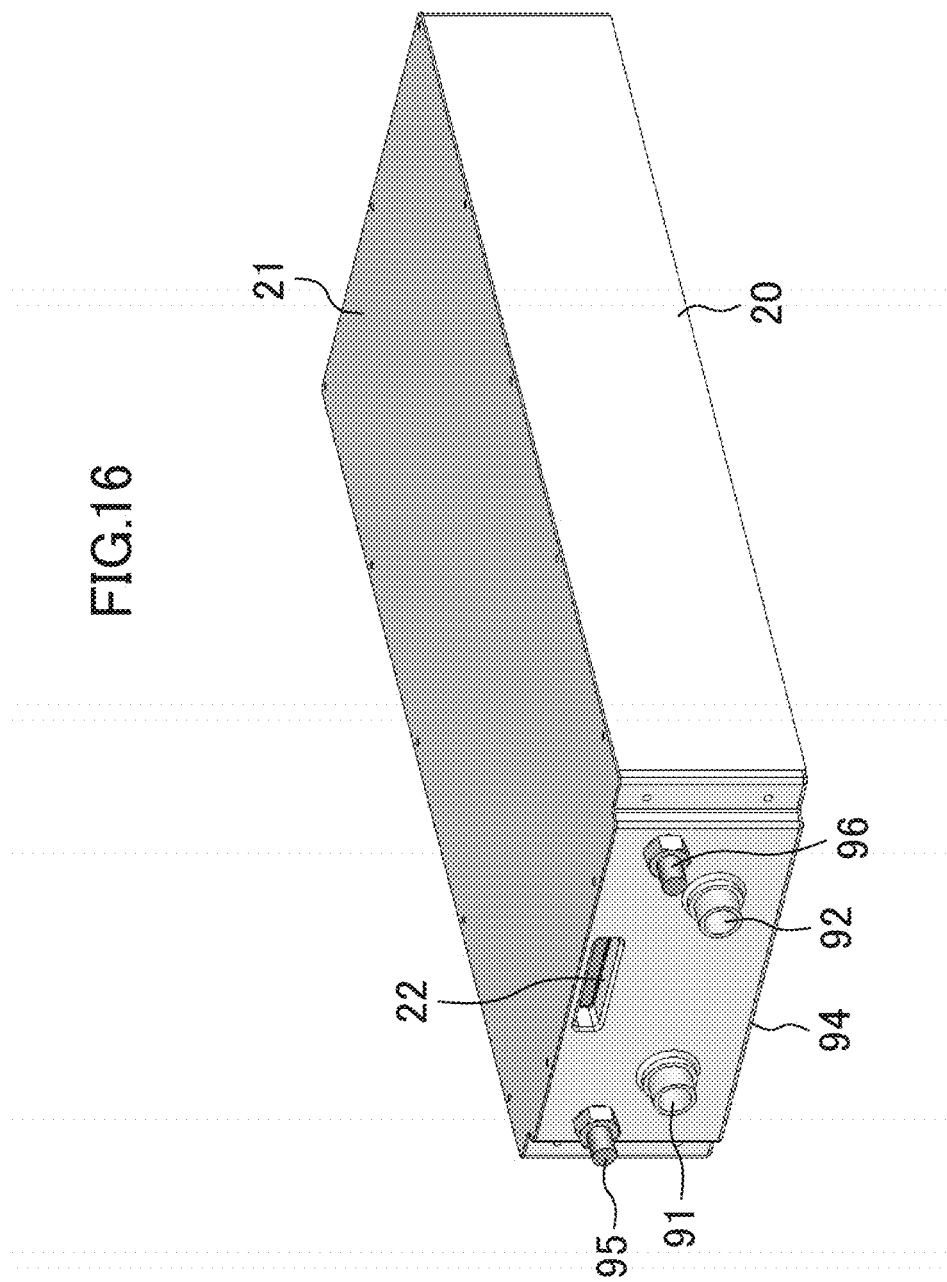
FIG. 16 is a perspective view illustrating the battery module of the specific example.

FIG. 15 is a disassembled perspective view illustrating a battery module of this specific example. FIG. 16 is a perspective view illustrating the battery module.

As illustrated in FIG. 15, a temperature adjustment unit 90, a battery assembly group 400, a resin intermediate panel 93, and a metal (e.g., aluminium) partition 40 are housed in a resin case 20. The top of the case 20 is covered with a metal (e.g., aluminium) external plate (lid) 21. The front of the case 20 is covered with a resin front panel 94.

In the battery assembly group 400, seven battery assemblies 300 each including 20 parallel-connected cells 100 are connected in series. The cells 100 are series-parallel connected, i.e., connected in series in some places and in parallel in other places, by the connection group 85 illustrated in FIG. 9. A positive electrode terminal 87 of the battery assembly group 400 is connected to one of the positive electrode bus bars 83 constituting the battery assemblies 300 (see FIG. 12), and are connected to a positive electrode terminal 96 for external connection provided on the front panel 94. A negative electrode terminal 86 of the battery assembly group 400 is connected to one of the negative electrode bus bars constituting the battery assemblies 300 (see FIG. 12), and are connected to a negative electrode terminal 95 for external connection provided on the front panel 94.

FIGS. 17(a) and 17(b) show a structure of the partition 40. Specifically, FIG. 17(a) is a perspective view, and FIG. 17(b) is a plan view. The partition 40 is made of, for example, aluminium. As illustrated in FIGS. 17(a) and 17(b), a plurality of through holes 40a are formed at positions corresponding to the positive electrode terminals 8 of the cells 100. On the top surface of the partition 40, projections 40b are arranged in two lines.

FIGS. 18(a) and 18(b) show a structure of the intermediate panel 93. Specifically, FIG. 18(a) is a perspective view, and FIG. 18(b) is a plan view. The intermediate panel 93 is made of, for example, a resin, and is partitioned into four hollow portions 93a along the parallel connection of the battery assemblies 300, as illustrated in FIGS. 18 (a) and 18(b).

As illustrated in FIG. 15, the temperature adjustment unit 90 has holding portions 90a in which the cells 100 constituting the battery assembly group 400 are inserted to be held. A flow path though which a fluid flows is formed among the holding portions 90a, 90a, . . . . In addition, inlet and outlet tubes 91 and 92 for supplying a fluid to the flow path are connected to the front panel 94 of the temperature adjustment unit 90, and are inserted in through holes 98 and 99 formed in the front panel 94.

Figure 19:
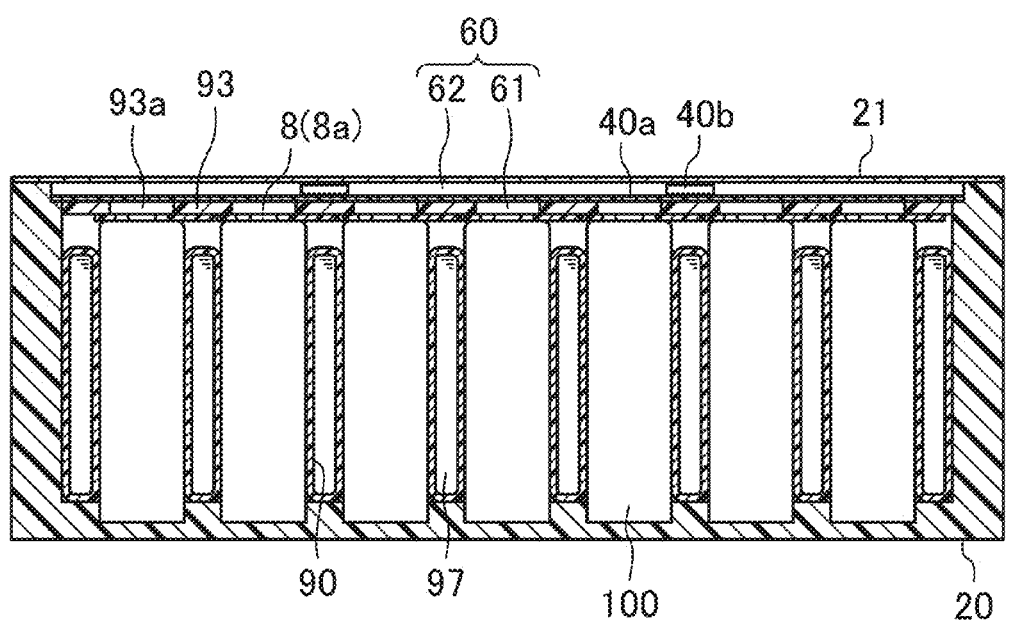
FIG. 19 is a cross-sectional view taken along the direction in which the battery assemblies of a battery module are connected in series.

FIG. 19 is a cross-sectional view taken along the direction in which the battery assemblies 300 of battery modules are connected in series. As illustrated in FIG. 19, the cells 100 are housed in the holding portions 90a of the temperature adjustment unit 90, and have their temperatures adjusted by the fluid flowing in a flow path 97. The case 20 is partitioned, by the connection group 85 provided on the positive electrode terminals 8 of the cells 100, into a housing space housing the cells 100 and an exhaust duct 60 for releasing a gas from the vents 8a of the cells 100 to outside the case 20. The vents 8a of the cells 100 communicate with the exhaust duct 60 through the through holes 83a, 82a, and 81a of the negative electrode bus bar 81, the insulating plate 82, and the positive electrode bus bar 83 constituting the connection group 85.

The exhaust duct 60 is divided into a first space 61 and a second space 62 by a partition 40 provided between the connection group 85 and the external plate 21 of the case 20. The first space 61 communicates with the second space 62 through the through holes 40a formed in the partition 40. The first space 61 is divided into a plurality of subspaces by hollow portions 93a formed in the intermediate panel 93. In this manner, a gas from the vents 8a of the cells 100 is released to the first space 61 (i.e., the subspaces) through the through holes 83a, 82a, and 81a of the connection group 85, and is guided to the second space 62 through the through holes 40a formed in the partition 40, and then is released to outside the case 20 through the release outlet 22 formed in the front panel 94.

(Third Embodiment)

In the first embodiment, although the exhaust duct 60 is divided into the first space 61 and the second space 62 by the partition 40, a gas released from the first space 61 to the second space 62 has a temperature equal to or lower than a temperature at which the gas does not react with oxygen, and thus, the possibility of combustion of a gas is eliminated in the second space 62. Accordingly, unlike the first space 61, the second space 62 does not need to have a volume as small as possible for adiabatic expansion, and is allowed to have a relatively large volume as compared to the first space. In other words, an exhaust space corresponding to the second space 62 does not need to be provided in the case 20 housing a plurality of cells 100.

A battery module according to this embodiment employs a configuration in which a first exhaust space (corresponding to the first space 61) defined by a flat plate 30 placed at the same sides of the cells 100 is provided in a case 20 and a second exhaust space (corresponding to the second space 62) communicating with the first exhaust space is provided to be in contact with the case 20.

In this embodiment, in a manner similar to that in the first embodiment, the volume of the first exhaust space is adjusted such that when a gas released from vent 8a of the cell 100 to the first exhaust space by adiabatic expansion is released from the first exhaust space to the second exhaust space, this gas has a temperature equal to or lower than a temperature at which the gas does not react with oxygen.

Figure 20:
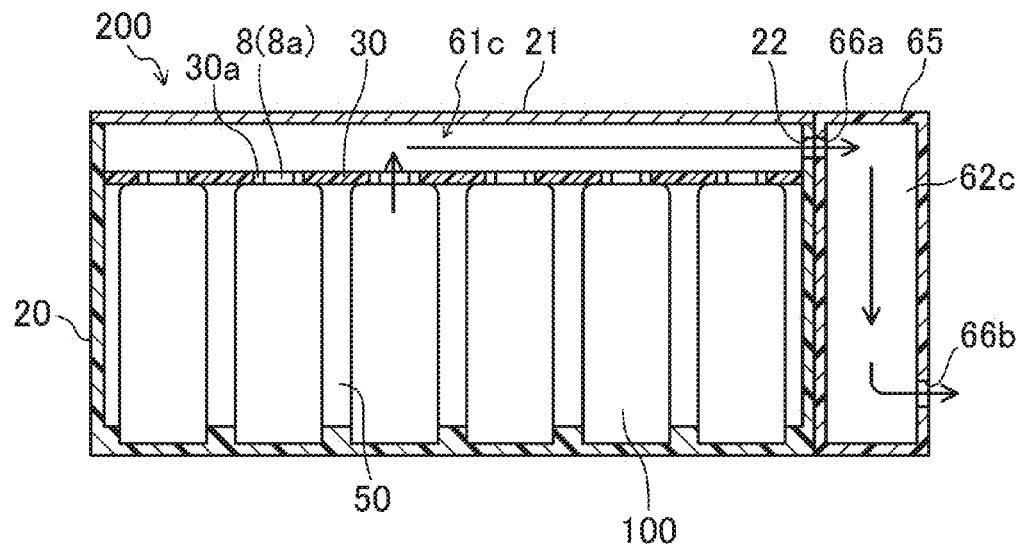
FIG. 20 is a cross-sectional view schematically illustrating a configuration of a battery module according to a third embodiment.

FIG. 20 is a cross-sectional view schematically illustrating a configuration of a battery module 200 according to this embodiment.

As illustrated in FIG. 20, a plurality of cells 100 are arranged and housed in a case 20. As illustrated in FIG. 1, the cells 100 have vents 8a through which a gas generated in the cells 100 is released to outside the cells 100.

The case 20 is divided, by a flat plate 30 provided at the same sides of the cells 100, into a housing space 50 housing the cells 100 and a first exhaust space 61c from which a gas from the vents 8a of the cells 100 is released to outside the case 20 through a release outlet 22 provided in the case 20. The vents 8a of the cells 100 communicate with the first exhaust space 61c through openings 30a formed in the flat plate 30.

In this embodiment, an exhaust duct 65 including a second exhaust space 62c having an aperture 66a communicating with the release outlet 22 is in contact with the case 20. A gas from the vents 8a of the cells 100 is released to the first exhaust space 61c through the openings 30a formed in the flat plate 30, is guided to the second exhaust space 62c through the aperture 66a, and then is released to outside the case 20 through a release outlet 66b formed in the exhaust duct 65.

In this embodiment, the case 20 and the exhaust duct 65 may be formed as an integrated unit. In this case, the battery module 200 includes the housing space 50, the first exhaust space 61c, and the exhaust duct 65.

Figure 21:
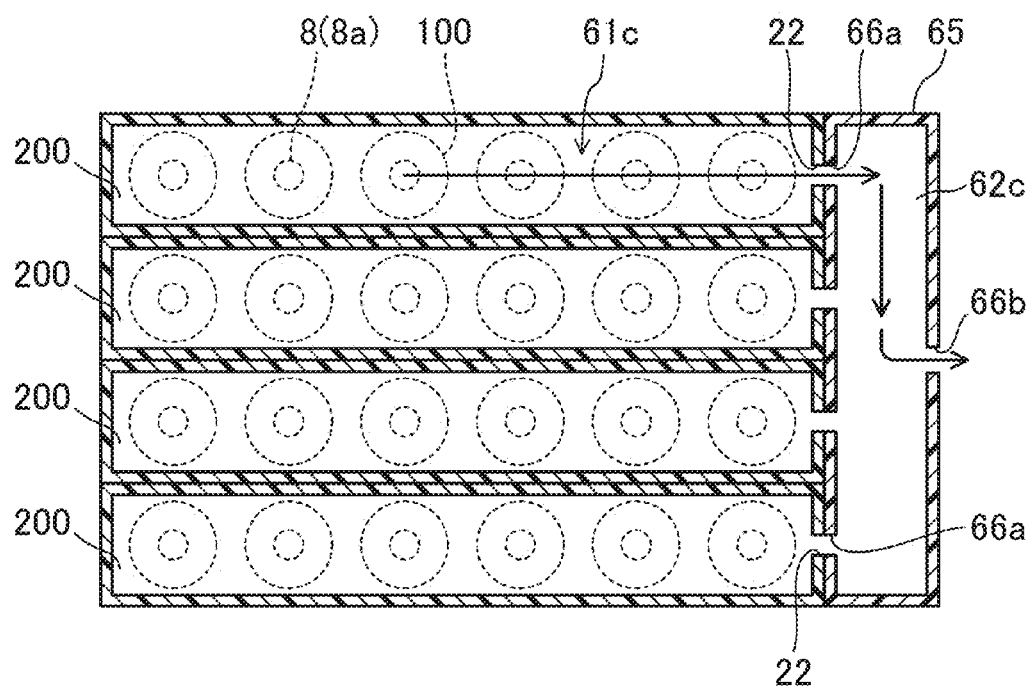
FIG. 21 is a plan view illustrating a variation of the battery module of the third embodiment.

FIG. 21 is a plan view illustrating a variation of the battery module shown in FIG. 20. In this variation, a plurality of (four in FIG. 21) of battery modules 200 in each of which a plurality of cells 100 are aligned are arranged in parallel. In this case, instead of the exhaust duct 65 including the second exhaust space 62c and provided for each of the battery modules 200, an exhaust duct 65 including apertures 66a communicating with the respective release outlets 22 of the battery modules 200 may be provided to be in contact with the cases 20 of the battery modules 200. In this manner, the exhaust duct 65 shared by the battery modules 200 can increase the substantial volume ratio of the exhaust duct 65 to the exhaust spaces 61c of the battery modules 200. As a result, a temperature decrease due to adiabatic expansion of a gas released from the first exhaust space 61c to the second exhaust space 62c can be facilitated.

Figure 22:
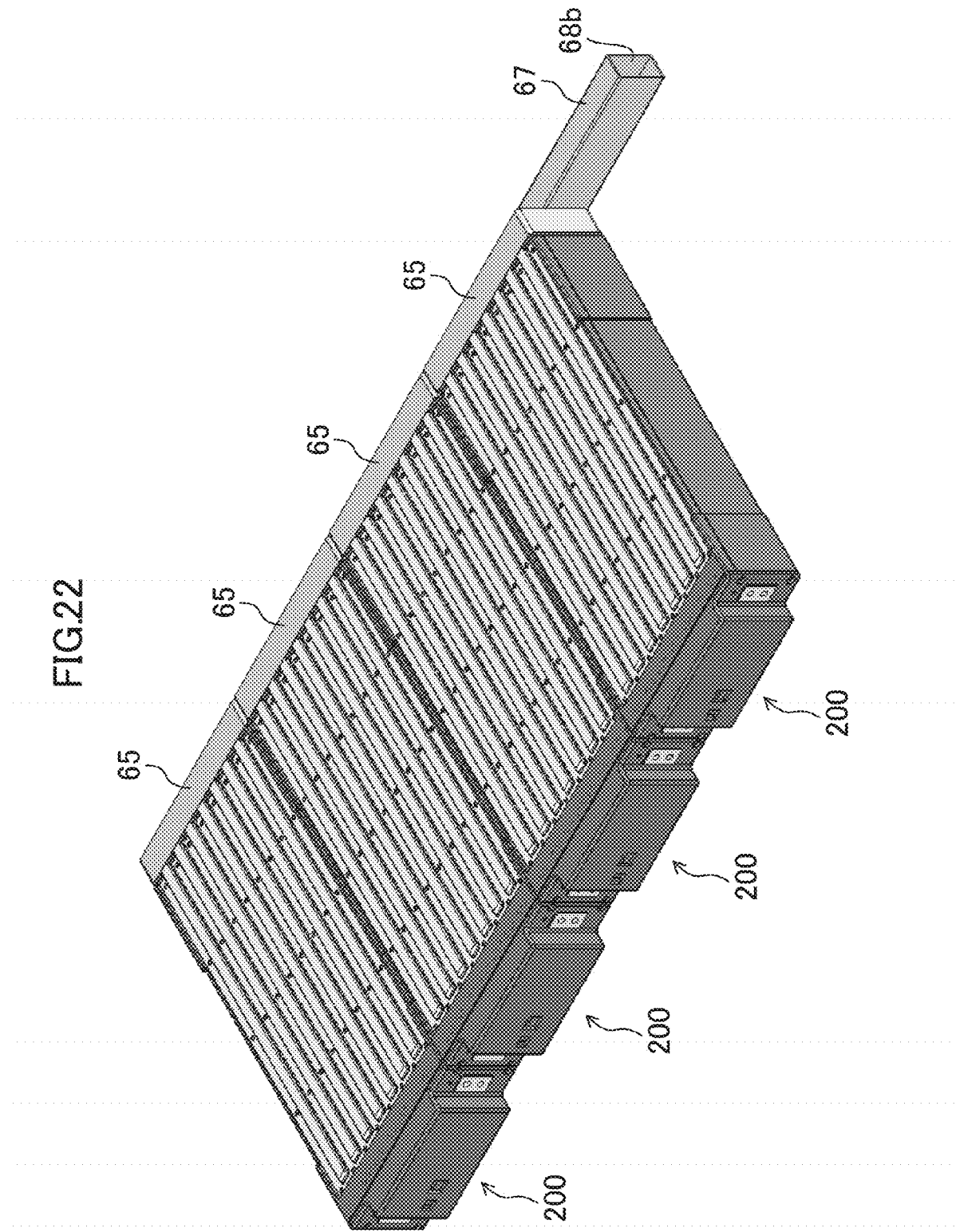
FIG. 22 is a perspective view illustrating a configuration of a battery pack in which a plurality of battery modules are arranged in parallel.

FIG. 22 is a perspective view illustrating a configuration of a battery pack in which a plurality of (four in FIG. 22) battery modules 200 including series-parallel connected cells 100 housed in the case 20 as shown in FIG. 15 are arranged in parallel. The battery modules 200 are in contact with the exhaust ducts 65 including the second exhaust spaces 62c. The first exhaust ducts 65 are in contact with second exhaust ducts 67 including third exhaust spaces 67c.

FIG. 23(a) is a cross-sectional perspective view illustrating a configuration of the battery module 200. FIG. 23(b) is a partial cross-sectional view of the battery module 200. FIG. 24 is a perspective view in which the first exhaust duct 65 and the second exhaust duct 67 are in contact with one battery module 200. FIG. 25 is a disassembled perspective view illustrating the structure shown in FIG. 24.

As illustrated in FIGS. 23(b) and 25, the first exhaust duct 65 has a plurality of apertures 66a communicating with the first exhaust space 61c of the battery module 200, and the second exhaust duct 67 has a plurality of apertures 68a communicating with the release outlet 66b of each of the first exhaust ducts 65.

As illustrated in FIG. 23(b), a gas from the vents 8a of the cells 100 is released to the first exhaust space 61c, is guided to the second exhaust space 62c through the apertures 66a, and then is released to the outside through a release outlet 68b provided in the second exhaust duct 67.

In this manner, a gas from the vents 8a of the cells 100 is adiabatically expanded in the first exhaust space 61c, the second exhaust space 62c, and the third exhaust space 67c in this order to be released to outside the battery pack while having its temperature reduced. As a result, a battery pack with a high degree of safety can be obtained.

The present disclosure has been described based on the foregoing preferred embodiments. These embodiments do not limit the present disclosure, and may be variously changed or modified. For example, in the above embodiments, the cells 100 are lithium ion secondary batteries, but may be other secondary batteries (e.g., nickel-metal hydride batteries).

INDUSTRIAL APPLICABILITY

The present disclosure is useful for power sources for driving automobiles, electric motorcycles, and electric play equipment, for example.

DESCRIPTION OF REFERENCE CHARACTERS 1 positive electrode
2 negative electrode
3 separator
4 electrode group
5 positive electrode lead
6 negative electrode lead
7 battery case
7a shoulder of battery case
8 positive electrode terminal (terminal plate)
8a vent
9, 10 insulating plate
11 gasket 12 filter
12a through hole
13 inner cap
13a through hole
14 valve
20 case
21 external plate (lid)
22 release outlet
23 bottom of case
24 rib
30 flat plate (circuit board)
30a opening
31 elastic member
40 partition
40a through hole
40b projection
41 side wall
50 housing space
60, 60a, 60b exhaust duct
61, 61a, 61b first space
61c first exhaust space
62c second exhaust space
62, 62a, 62b second space
63 subspace
65 (first) exhaust duct
66a, 68a aperture
66b, 68b release outlet
67 second exhaust duct
67c third exhaust space
70 positive electrode connection plate
70a opening
72 conductive part
73 negative electrode connection plate
81 negative electrode bus bar
81a, 82a, 83a through hole
81b stepped portion
81c negative electrode connection strip
82 insulating plate
83 positive electrode bus bar
83b end
84 positive electrode connection strip
84a first connection strip
84b second connection strip
84c stepped portion
85 connection group
86 negative electrode terminal of battery assembly group
87 positive electrode terminal of battery assembly group
90 temperature adjustment unit
90a holding portion
91, 92 inlet and outlet tubes
93 intermediate panel
93a hollow portion
94 front panel
95 negative electrode terminal for external connection
96 positive electrode terminal for external connection
97 flow path
100 cell
200 battery module
300 battery assembly
400 battery assembly group

The invention claimed is:

1. A battery module with an exhaust duct, the battery module comprising:
a case; and
a plurality of cells,
wherein the case is divided into a housing space and a first exhaust space by a flat plate,
the flat plate has a plurality of openings,
the housing space houses the plurality of cells,
each of the plurality of cells includes a vent,
the vent is disposed in each of the plurality of openings,
the first exhaust space has a plurality of release outlets,
the exhaust duct includes a second exhaust space,
the second exhaust space, adjacent to the first exhaust space, has a plurality of apertures, and
each of the plurality of release outlets is associated with one of the plurality of apertures.

2. The battery module of claim 1, wherein each of the plurality of release outlets communicates with an associated one of the plurality of apertures.

3. The battery module of claim 1, wherein the flat plate is in close contact with an end of each of the plurality of cells, and the housing space is hermetically sealed by the flat plate.

4. The battery module of claim 1, wherein a volume of the first exhaust space is adjusted such that when a gas at a high temperature released from one of the vents of the plurality of cells to the first exhaust space by adiabatic expansion is released from the first exhaust space to the second exhaust space, the gas has a temperature reduced to a predetermined temperature or lower.

5. The battery module of claim 4, wherein the predetermined temperature is a temperature at which the gas released from one of the vents does not react with oxygen.

6. The battery module of claim 4, wherein the plurality of cells are lithium ion secondary batteries, and
the predetermined temperature is 450° C.

7. The battery module of claim 4, wherein a volume of the second exhaust space is adjusted such that when a gas released from the first exhaust space to the second exhaust space by adiabatic expansion is released from the second exhaust space to outside the case, the gas has a temperature equal to or lower than a temperature at which no significant problems occur even when the gas is released to outside the case.

8. The battery module of claim 7, wherein the temperature at which no significant problems occur even when the gas is released to outside the case is 200° C.

9. The battery module of claim 1, wherein the vent of each of the plurality of cells is provided in a positive electrode projection of the cell, and
the positive electrode projection is inserted in the opening of the flat plate.

10. The battery module of claim 1, wherein the flat plate includes a connection plate to which at least an electrode of each of the plurality of cells is connected, and
the electrodes of the plurality of cells connected to the connection plate are connected in parallel.

11. The battery module of claim 1, wherein the first exhaust space is divided into a first space and a second space by a partition,
the first space is formed between the flat plate and the partition,
the second space is formed between the partition and an external plate or a bottom of the case, and
the partition has a plurality of through holes.

12. The battery module of claim 1, wherein the location of the plurality of through holes can substantially control the volume of the first space.

13. The battery module of claim 1, wherein the gas from the one of the vents of the plurality of cells is released to the first exhaust space, is guided through the plurality of apertures to the second exhaust space which has a larger volume than the first exhaust space, and then is released outside.

* * * * *